US012296661B2

(12) United States Patent
Kosch et al.

(10) Patent No.: US 12,296,661 B2
(45) Date of Patent: May 13, 2025

(54) PANEL SUPPORT STRUCTURE FOR EXPANDED SUNROOF OPENING

(71) Applicant: Aisin Technical Center of America, Inc., Northville, MI (US)

(72) Inventors: Glover Kosch, Ann Arbor, MI (US); Mike Mixon, Brighton, MI (US); Jacob Grimaldo, Westland, MI (US); Tatsuya Matsui, Novi, MI (US)

(73) Assignee: Aisin World Corp. of America, Northville, MI (US)

( * ) Notice: Subject to any disclaimer, the term of this patent is extended or adjusted under 35 U.S.C. 154(b) by 265 days.

(21) Appl. No.: 17/980,801

(22) Filed: Nov. 4, 2022

(65) Prior Publication Data

US 2024/0149650 A1    May 9, 2024

(51) Int. Cl.
*B60J 7/043*    (2006.01)
*B60J 7/047*    (2006.01)

(52) U.S. Cl.
CPC ............. *B60J 7/047* (2013.01); *B60J 7/0435* (2013.01)

(58) Field of Classification Search
CPC ............................... B60J 7/047; B60J 7/0435
USPC ............ 296/216.02–216.5, 220.01, 221, 222
See application file for complete search history.

(56) References Cited

U.S. PATENT DOCUMENTS

| | | | |
|---|---|---|---|
| 4,830,428 A | 5/1989 | Masuda et al. | |
| 4,874,202 A | 10/1989 | Ochiai et al. | |
| 6,685,263 B2 * | 2/2004 | Sawada | B60J 10/82 296/216.06 |
| 6,942,286 B2 * | 9/2005 | Bohm | B60J 7/047 296/220.01 |
| 8,297,692 B2 | 10/2012 | Chlapecka et al. | |
| 10,239,391 B1 | 3/2019 | Heins et al. | |
| 10,752,098 B2 | 8/2020 | Takakura et al. | |
| 10,857,862 B2 | 12/2020 | Grimaldo | |
| 11,052,736 B2 | 7/2021 | Hiramatsu | |
| 2020/0276892 A1 | 9/2020 | Hiramatsu | |

FOREIGN PATENT DOCUMENTS

FR    2857910 A1 *  1/2005 ............. B60J 7/047
JP    1988032646 B2    3/1988

OTHER PUBLICATIONS

FR2857910 Text (Year: 2005).*
U.S. Appl. No. 17/452,965, filed Oct. 29, 2021.

* cited by examiner

*Primary Examiner* — Dennis H Pedder
(74) *Attorney, Agent, or Firm* — Christopher G. Darrow; Darrow Mustafa PC

(57) ABSTRACT

An assembly for a sunroof of a vehicle includes a longitudinal rail defining a longitudinal cavity having an opening. A bracket supports a first sunroof panel for movement along the rail, between a closed position and a fully open position. A portion of the bracket extends into the cavity opening and is movable along the cavity from a first side of a plane extending through a forward-most edge of the second sunroof panel to a second side of the plane opposite the first side of the plane, during movement of the first sunroof panel to the fully open position. Enabling the support bracket to move to the second side of the plane aids in maximizing the size of the sunroof opening when the panel is in the fully open position.

10 Claims, 20 Drawing Sheets

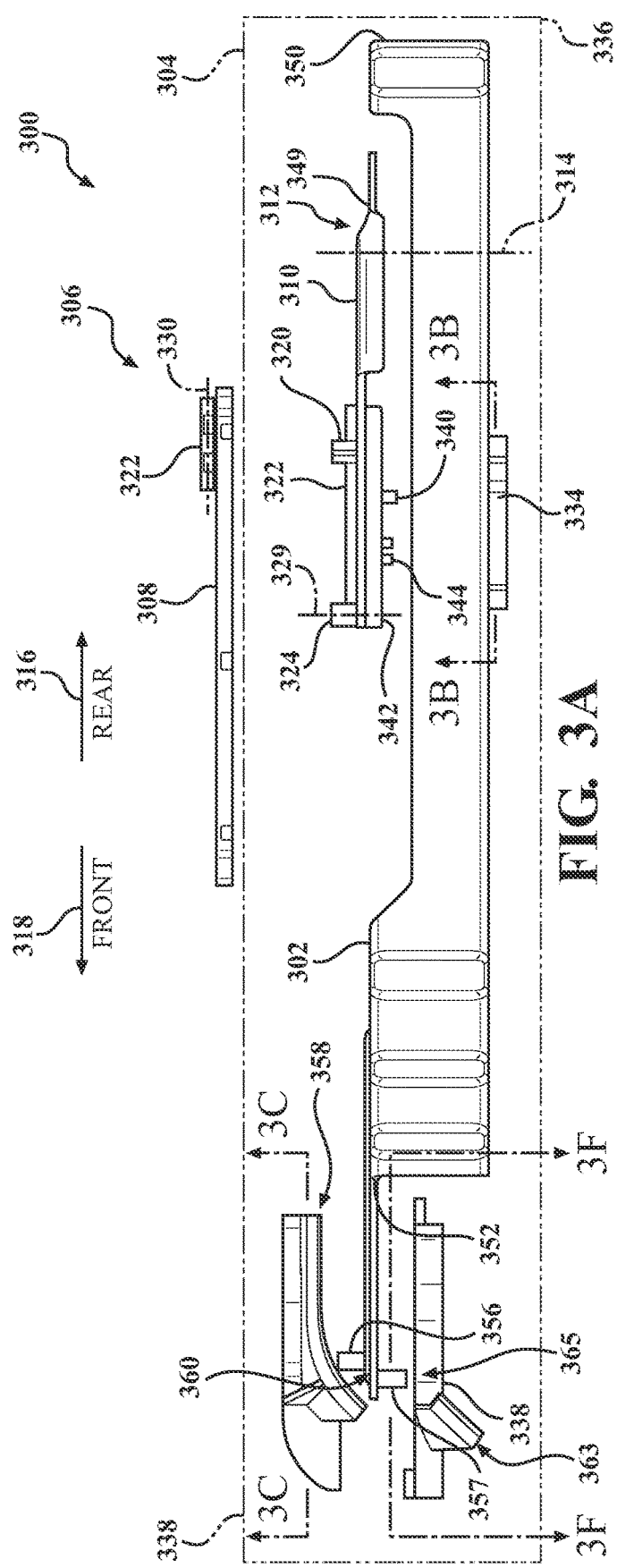
FIG. 3A
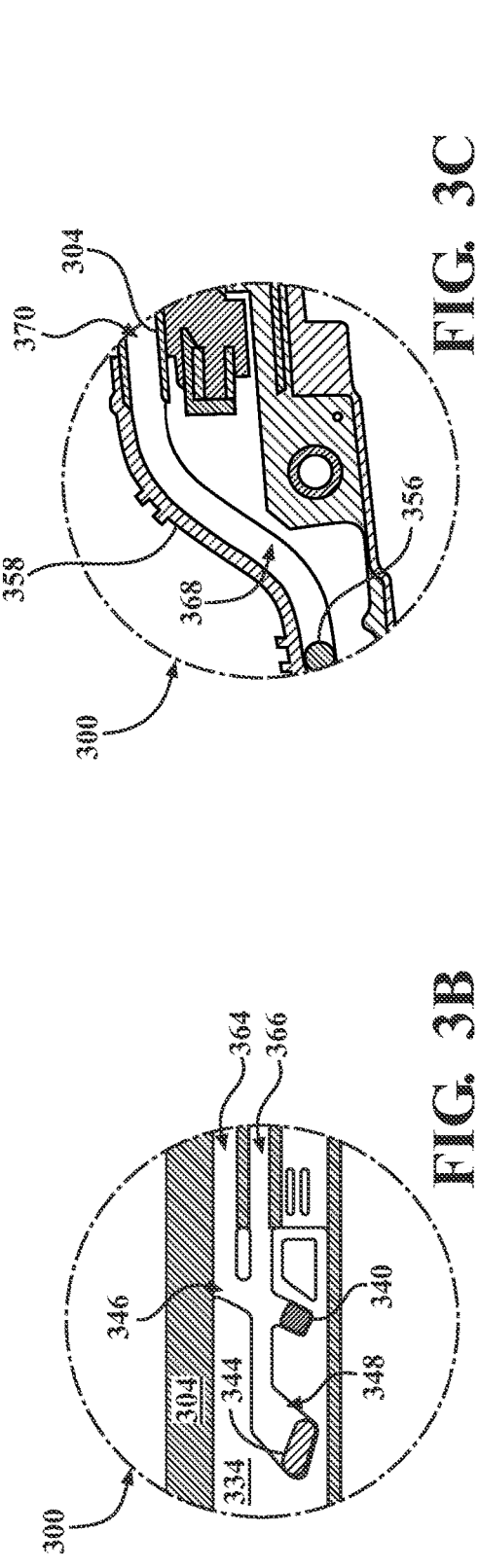
FIG. 3C
FIG. 3B

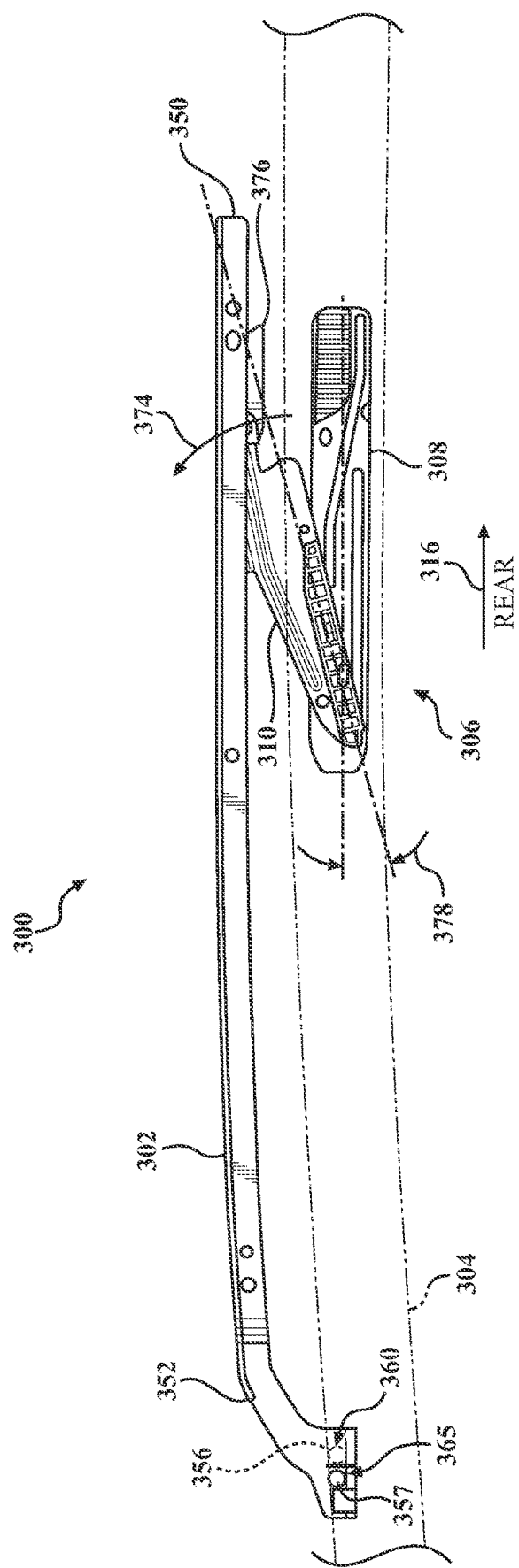
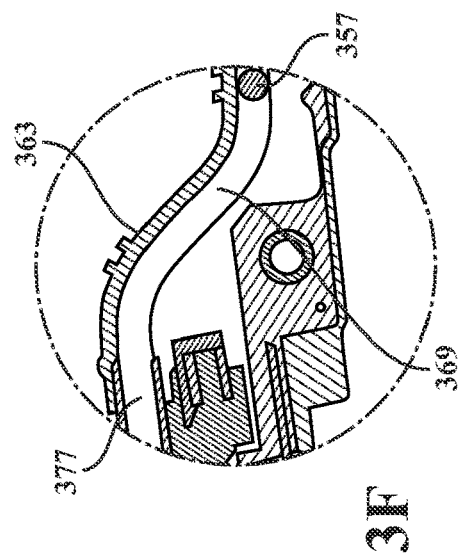
FIG. 3E
FIG. 3F

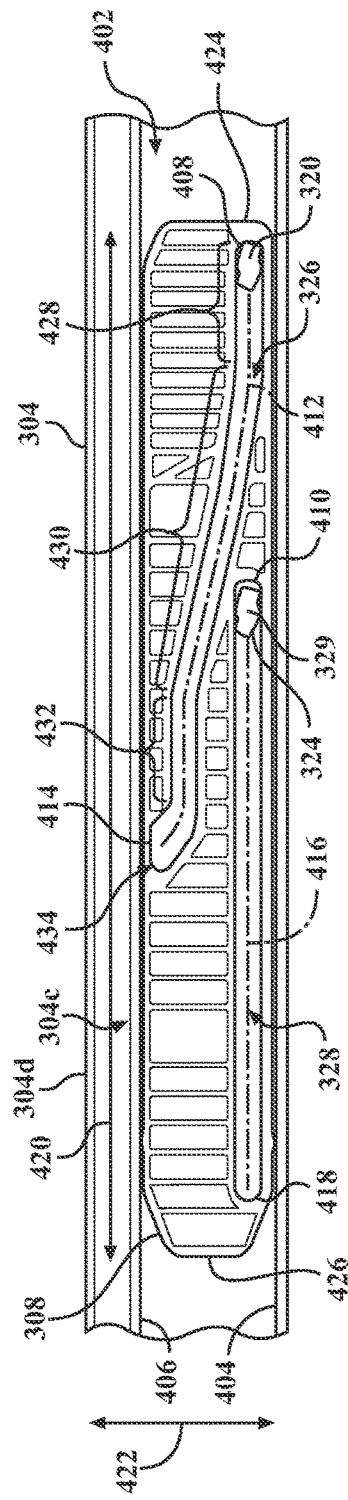 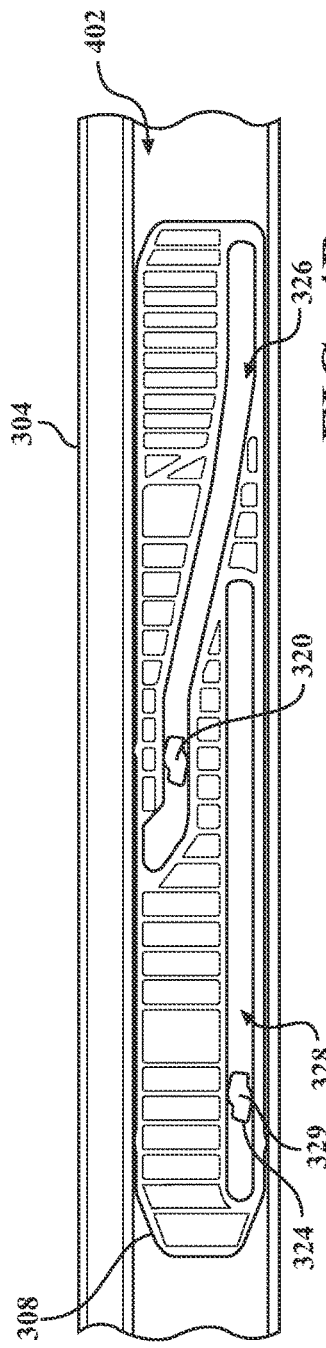 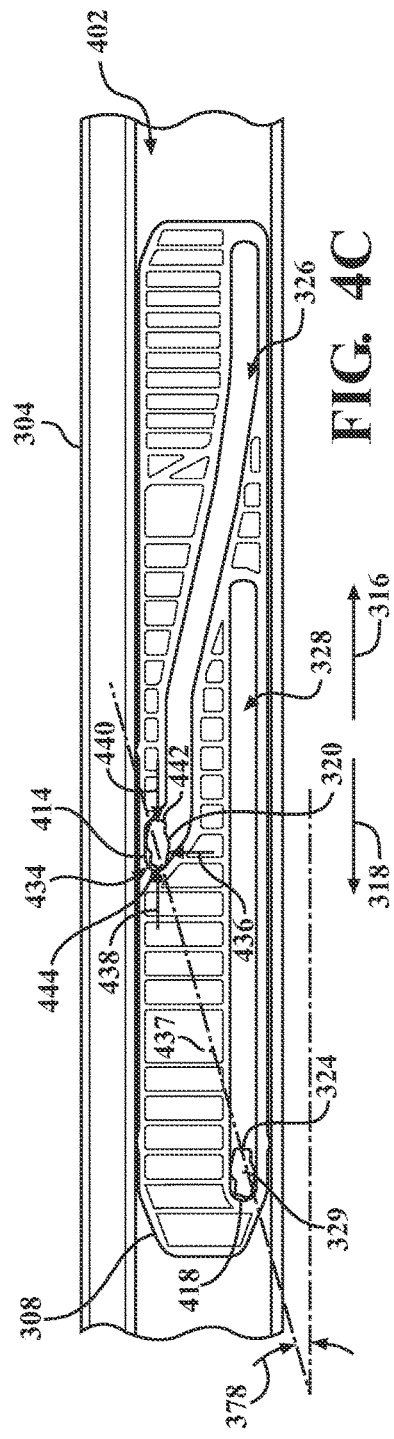

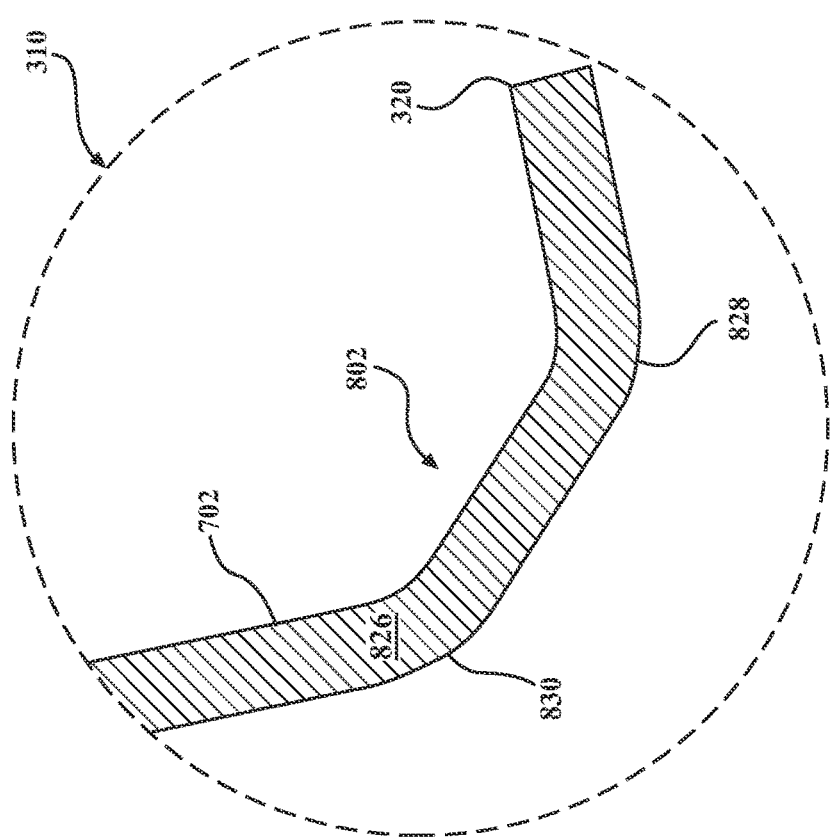
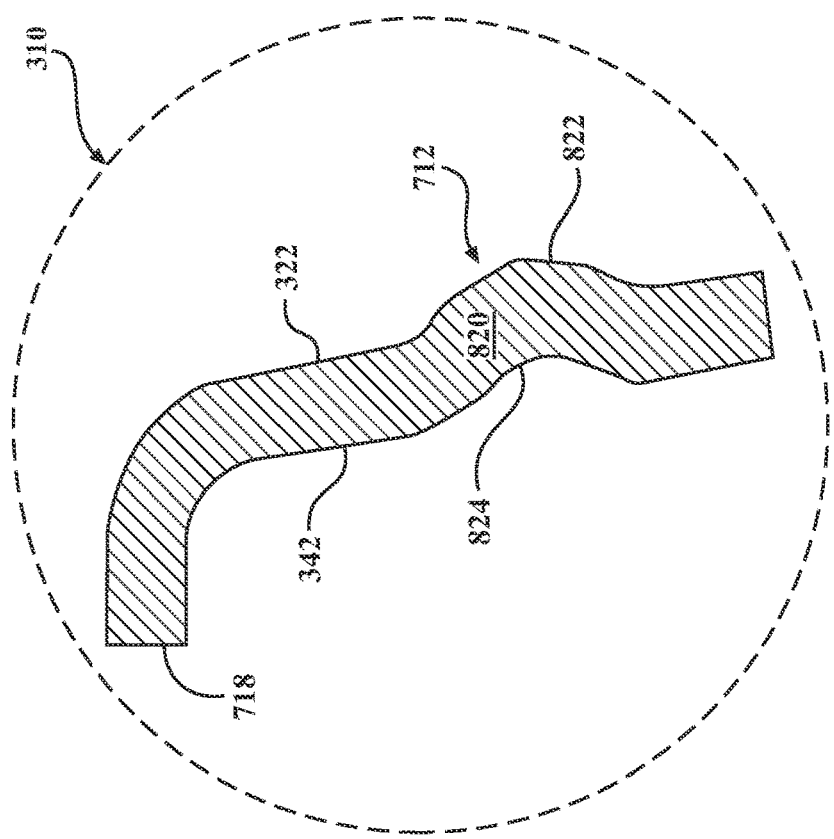
FIG. 7C
FIG. 7D

PANEL SUPPORT STRUCTURE FOR EXPANDED SUNROOF OPENING

TECHNICAL FIELD

This disclosure relates generally to vehicles and, more particularly, to sunroof drive apparatuses and related sunroof assemblies for use with vehicles.

BACKGROUND

Motor vehicles typically employ sunroofs to improve comfort of vehicle occupants by allowing sunlight to enter a vehicle cabin through a sunroof panel (e.g., glass). Some vehicle sunroofs are configured to open and close, which may be desirable to the vehicle occupants (e.g., when the vehicle cabin is relatively hot). For example, a known vehicle sunroof may have a panel that can be moved (e.g., tilted, raised, lowered, etc.) by a motorized support/movement structure configured to move the panel in response to a sunroof motor generating output.

Owners of vehicles with sunroofs generally find it desirable to have as large a sunroof opening as possible when the sunroof is actuated to a fully open condition. However, the designs of some panel support/movement structures may restrict the amount by which an attached sunroof panel may be moved, thereby unnecessarily limiting the size of the sunroof opening.

SUMMARY

In one aspect of the embodiments described herein, an assembly is provided for a sunroof of a vehicle. The assembly includes a longitudinal rail defining an associated longitudinal cavity having an opening, a first sunroof panel, and a second sunroof panel. The first sunroof panel is movable with respect to the second sunroof panel between a closed position of the first sunroof panel and a fully open position of the first sunroof panel. The second sunroof panel has a lateral edge. A bracket is attached to the first sunroof panel so that the first sunroof panel moves with the bracket. A portion of the bracket extends from the first sunroof panel into the rail cavity opening and is operably connected to the rail so as to be movable along the rail cavity opening during movement of the first sunroof panel between the closed position and the fully open position. The assembly is structured so that the portion of the bracket is movable along the rail cavity opening from a first side of a plane extending through the second sunroof panel lateral edge and perpendicular to an opening direction of the first panel, to a second side of the plane opposite the first side of the plane, during movement of the first sunroof panel from the closed position to the fully open position.

In another aspect of the embodiments described herein, an assembly for a sunroof of a vehicle is provided. The assembly includes a longitudinal rail defining an associated longitudinal cavity having an opening, a first sunroof panel, and a second sunroof panel. The first sunroof panel is movable with respect to the second sunroof panel between a closed position of the first sunroof panel and a fully open position of the first sunroof panel. The second sunroof panel has a lateral edge with a seal operably attached therealong. The seal is structured to seal a seam formed between the first and second sunroof panels when the first sunroof panel is in the closed position. The seal has an edge spaced apart from the second sunroof panel lateral edge in a direction toward the first sunroof panel when the first sunroof panel is in the closed position. A bracket is attached to the first sunroof panel so that the first sunroof panel moves with the bracket. A portion of the bracket extends from the first sunroof panel into the rail cavity opening and is operably connected to the rail so as to be movable along the rail cavity opening during movement of the first sunroof panel between the closed position and the fully open position. The assembly is structured so that the portion of the bracket is movable from a first side of a plane extending through the seal edge and perpendicular to an opening direction of the first panel, to a second side of the plane opposite the first side of the plane, during movement of the first sunroof panel from the closed position to the fully open position.

BRIEF DESCRIPTION OF THE DRAWINGS

A clear understanding of the key features of the embodiments disclosed herein may be had by reference to the appended drawings, which illustrate the method and system of the invention, although it will be understood that such drawings depict particular embodiments of the invention and, therefore, are not to be considered as limiting its scope with regard to other embodiments contemplated by the invention. In addition, similar elements or structures appearing in different drawing views showing different embodiments of the invention may be designated by similar reference characters.

FIGS. 3A, 3B, 3C, 3D, 3E, and 3F are detailed views of an example assembly for a sunroof of a vehicle in accordance with the teachings of this disclosure;

FIGS. 4A, 4B, and 4C are detailed views of an example drive shoe and show different stages of a sunroof opening operation;

FIGS. 7A, 7B, 7C, 7D, and 7E are other detailed views of the example link of FIG. 6 and show additional implementations thereof;

The figures are not to scale. In general, the same reference numbers will be used throughout the drawing(s) and accompanying written description to refer to the same or like parts.

DETAILED DESCRIPTION

Described herein are embodiments of an assembly structured to support and move a panel of a vehicle sunroof. The assembly includes a longitudinal rail defining an associated longitudinal cavity having an opening, a first sunroof panel, and a second sunroof panel. The first sunroof panel is movable with respect to the second sunroof panel between a closed position of the first sunroof panel and a fully open position of the first sunroof panel. The second sunroof panel has a lateral edge. A bracket is attached to the first sunroof panel so that the first sunroof panel moves with the bracket. A portion of the bracket extends from the first sunroof panel into the rail cavity opening and is operably connected to the rail so as to be movable along the rail cavity opening during movement of the first sunroof panel between the closed position and the fully open position. The assembly is structured so that the portion of the bracket is movable along the rail cavity opening from a first side of a plane extending through the second sunroof panel lateral edge and perpendicular to an opening direction of the first panel, to a second side of the plane opposite the first side of the plane, during movement of the first sunroof panel from the closed position to the fully open position. Enabling the bracket to move to the second side of the plane aids in maximizing an amount which the panel can be moved, which aids in maximizing the size of the sunroof opening when the panel is in the fully open position.

Figure 1:
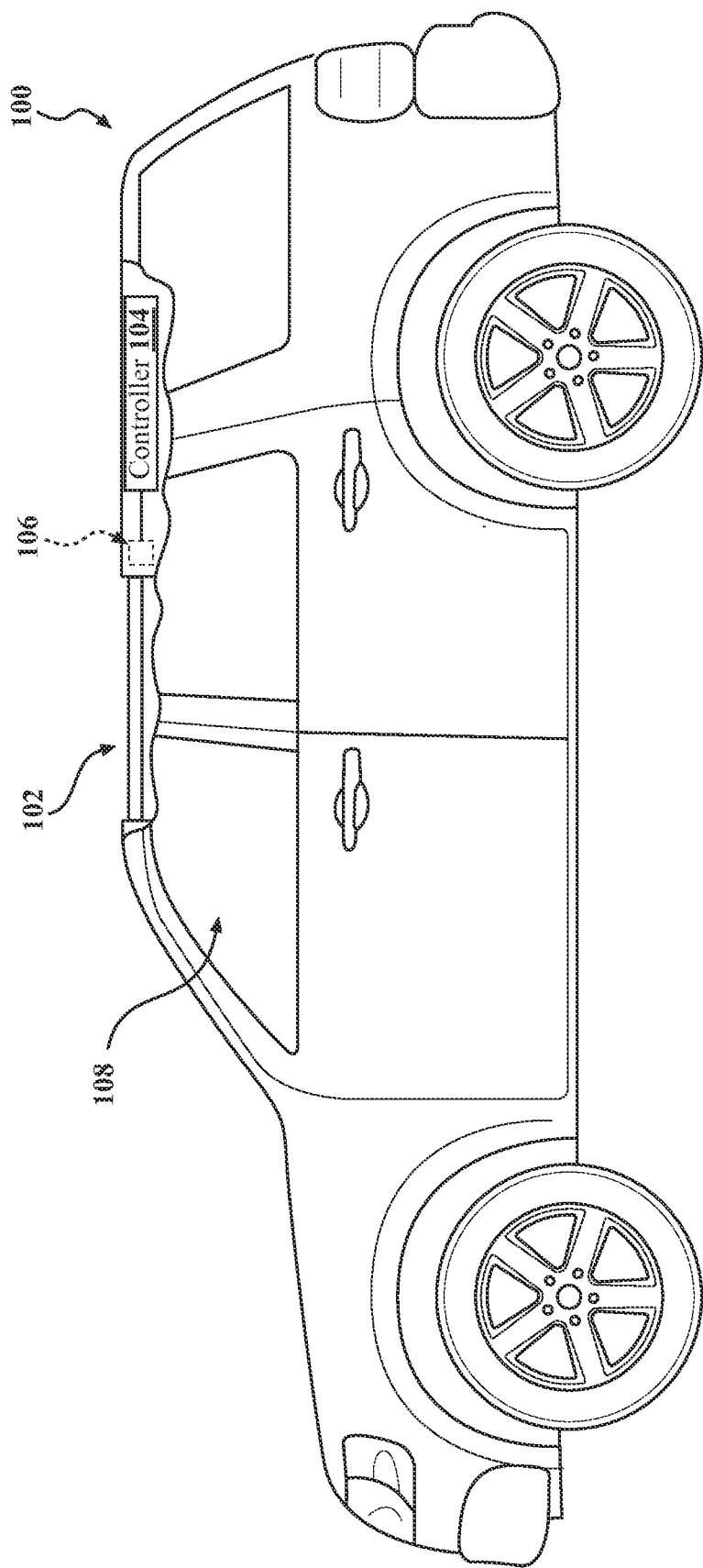
FIG. 1 is a view of a vehicle incorporating a sunroof assembly in accordance with an embodiment described herein.

FIG. 1 is a view of an example vehicle (e.g., a motor vehicle) 100 in which examples disclosed herein can be implemented. The vehicle 100 of FIG. 1 could be, for example, any of a car, a van, a truck, a sport utility vehicle (SUV), and like, or any other suitable motor vehicle. According to the illustrated example of FIG. 1, the vehicle 100 includes an example sunroof 102, an example controller 104, and one or more example motors 106. The controller of FIG. 1 is structured and/or configured to control the motor(s) 106 to change a state of the sunroof 102, for example, from a first state (e.g., a closed state) to a second state (e.g., an open state) or vice versa. In some examples, the controller 104 of FIG. 1 receives a user input from an input device (e.g., an in-vehicle button or switch accessible to an occupant in the vehicle 100) connected to the controller 104 and, in response, opens or closes the sunroof 102 via the motor(s) 106 and based on the user input.

The controller 104 of FIG. 1 can be implemented, for example, using one or more microcontrollers, one or more electronic control units (ECUs), and the like, any other suitable control circuitry, or a combination thereof. As such, the controller 104 may include at least one processor and a database in communication with the processor. The controller 104 is sometimes referred to as a sunroof controller and/or a vehicle controller. Additionally, the controller 104 is communicatively coupled to the motor(s) 106, for example, via a transmission or signal wire, a bus, radio frequency, etc. In some examples, the controller 104 provides electrical power and/or one or more control signals or commands to the motor(s) 106, thereby controlling the motor(s) 106 and/or an output thereof (e.g., a torque and/or a force). In other examples, the controller 104 receives (e.g., continuously and/or repeatedly) data from the motor(s) 106, such as positional data that may be indicative of a panel position and/or the state of the sunroof 102.

The controller 104 of FIG. 1 may also be communicatively coupled to an input device, which facilitates interactions between the controller 104 and a person or user. The input device may be positioned in the vehicle 100 such that a vehicle occupant can activate and/or provided an input to the input device. In some examples, the controller 104 receives input data from the input device corresponding to a certain sunroof state or panel position. In response to receiving the input data, the controller 104 processes the input data and/or directs the motor(s) 106 in accordance with the input data.

The sunroof 102 of FIG. 1 can be implemented, for example, using any of a panoramic sunroof, a pop-up sunroof, a sliding sunroof, a spoiler sunroof, and the like, or any other suitable vehicle sunroof. The sunroof 102 is sometimes referred to as a vehicle sunroof. In some examples, the sunroof 102 is structured and/or configured to open, close, vent, and/or change between different sunroof states, for examples, in response to the motor(s) 106 generating output. As such, the sunroof 102 may be provided with at least one movable panel (e.g., a glass panel) that can be tilted, raised, lowered, and the like. In such examples, when closed or in the first state, the sunroof 102 of FIG. 1 substantially isolates a cabin 108 of the vehicle 100 from an outside or external environment, such that external fluids (e.g., water, air, etc.) are prevented from flowing into the cabin 108 through the sunroof 102. Of course, light (e.g., sunlight) may be transmitted through the panel(s) of the sunroof 102 when the sunroof 102 is closed or in the first state. On the other hand, when open or in the second state, the sunroof 102 exposes the vehicle cabin 108 to the external environment, such that ambient air is permitted or enabled to flow into the vehicle cabin 108, which may be desired by a driver and/or vehicle occupant(s) in certain driving conditions.

The motor(s) 106 of FIG. 1 can be implemented, for example, using one or more electric motors. The motor(s) 106 are coupled to the sunroof 102 and/or supported by a sunroof component. Further, the motor(s) 106 may be communicatively coupled to the controller 104. In some examples, in response to receiving the power and/or the control signal(s) or command(s) from the controller 104, the motor(s) 106 cause the sunroof 102 to open, close, and/or change between the different sunroof states.

Figure 2A:
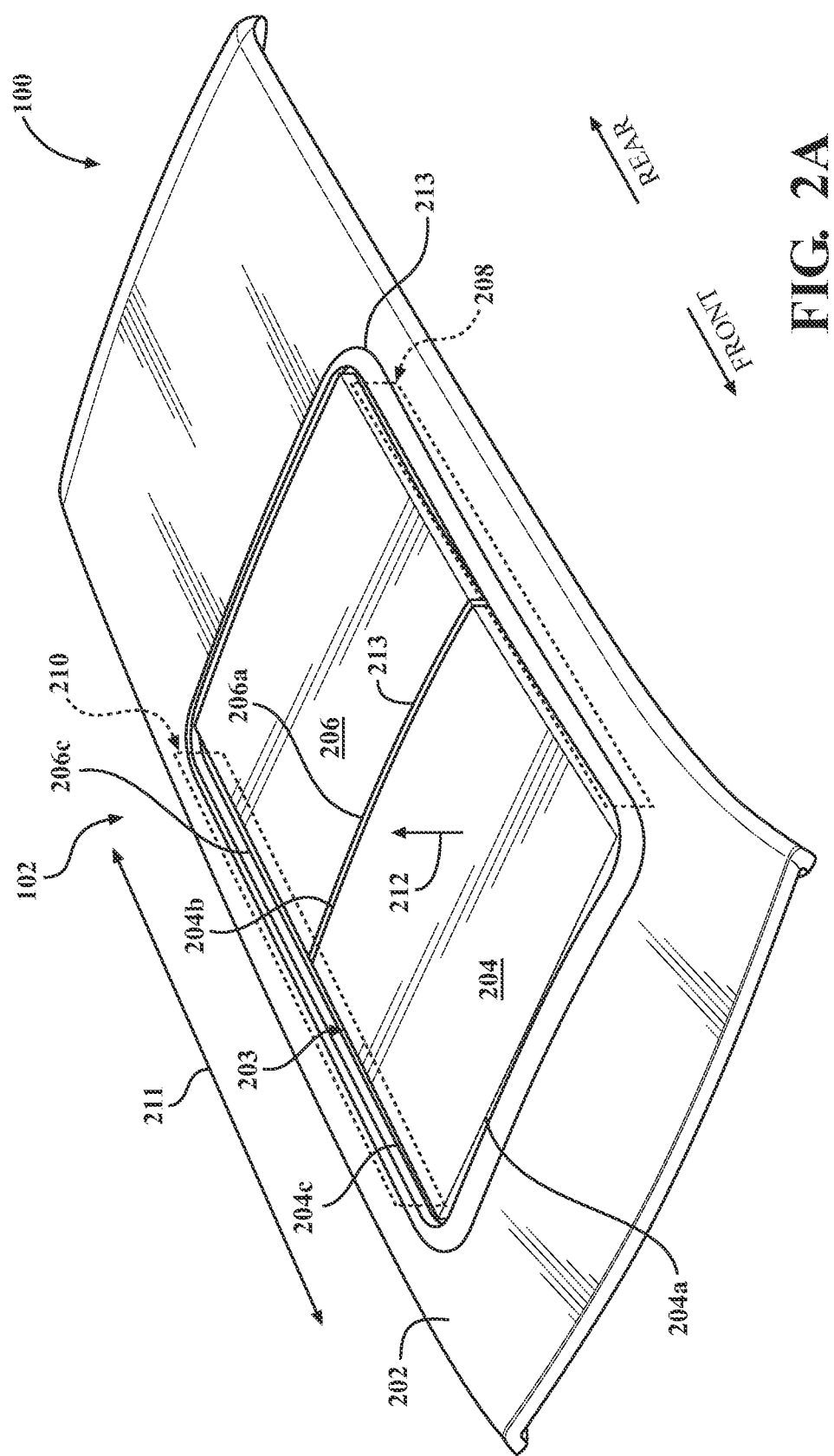
FIG. 2A is a partial-view of the example vehicle of FIG. 1 and shows an example vehicle sunroof in a first state.

FIG. 2A is a partial-view of the vehicle 100 and shows the sunroof 102 in the first state. The sunroof 102 of FIG. 2A is coupled to a roof 202 of the vehicle 100, for example, via one or more example fasteners and/or one or more example fastening methods or techniques. Further, the sunroof 102 of FIG. 2A or at least part thereof is disposed in an aperture 203 extending through the roof 202. The aperture 203 can be, for example, a relatively large opening in the roof 202 that is sized and/or shaped to receive one or more sunroof components. The sunroof 102 may be provided with one or more example panels (e.g., glass panels) 204, 206, two of which are shown in this example (i.e., a first panel 204 and a second panel 206). At least one of the panels may be supported for movement by an assembly (such as assembly 208 described herein) structured to support and translate the panel between a closed position and a fully open position, and (optionally) to any of a range of intermediate positions between the open and fully closed positions.

In FIG. 2A, the first panel 204 is movable and/or is configured to move between a first panel position (as shown in FIG. 2A) and a second panel position different from the first panel position, which changes the state of the sunroof 102. The first panel position can be, for example, a lowered or closed position of the first panel 204 corresponding to the first (closed) state of the sunroof 102.

First sunroof panel 204 may have a first lateral edge 204a and a second lateral edge 204b spaced apart from the first lateral edge 204a. A "lateral edge" may refer to an edge of the panel which extends in a direction generally laterally or orthogonally with respect to the length direction of the vehicle. In one or more arrangements, the second lateral edge 204b may extend generally parallel to the first lateral edge 204a. The second sunroof panel may also have a lateral edge 206a. The first panel second lateral edge 204b may be structured so as to reside adjacent the second panel lateral edge 206a as shown in FIG. 2A when the first panel 204 is in its closed position.

In addition, the first sunroof panel 204 may also include a longitudinal edge 204c extending between the first and second lateral edges 204a, 204b. A "longitudinal edge" or any longitudinally-extending feature or element as described herein may refer to an edge or feature which extends in a direction generally parallel to the length direction of the vehicle or generally parallel to a fore-aft axis of the vehicle. The first sunroof panel longitudinal edge 204c may extend adjacent and parallel to the rail cavity opening 304d (described in greater detail below). The second sunroof panel 206 may also include a longitudinal edge 206c extending from the second sunroof panel lateral edge 206a. The second sunroof panel longitudinal edge 206c may extend adjacent and parallel to the rail cavity opening 304d.

Figure 2B:
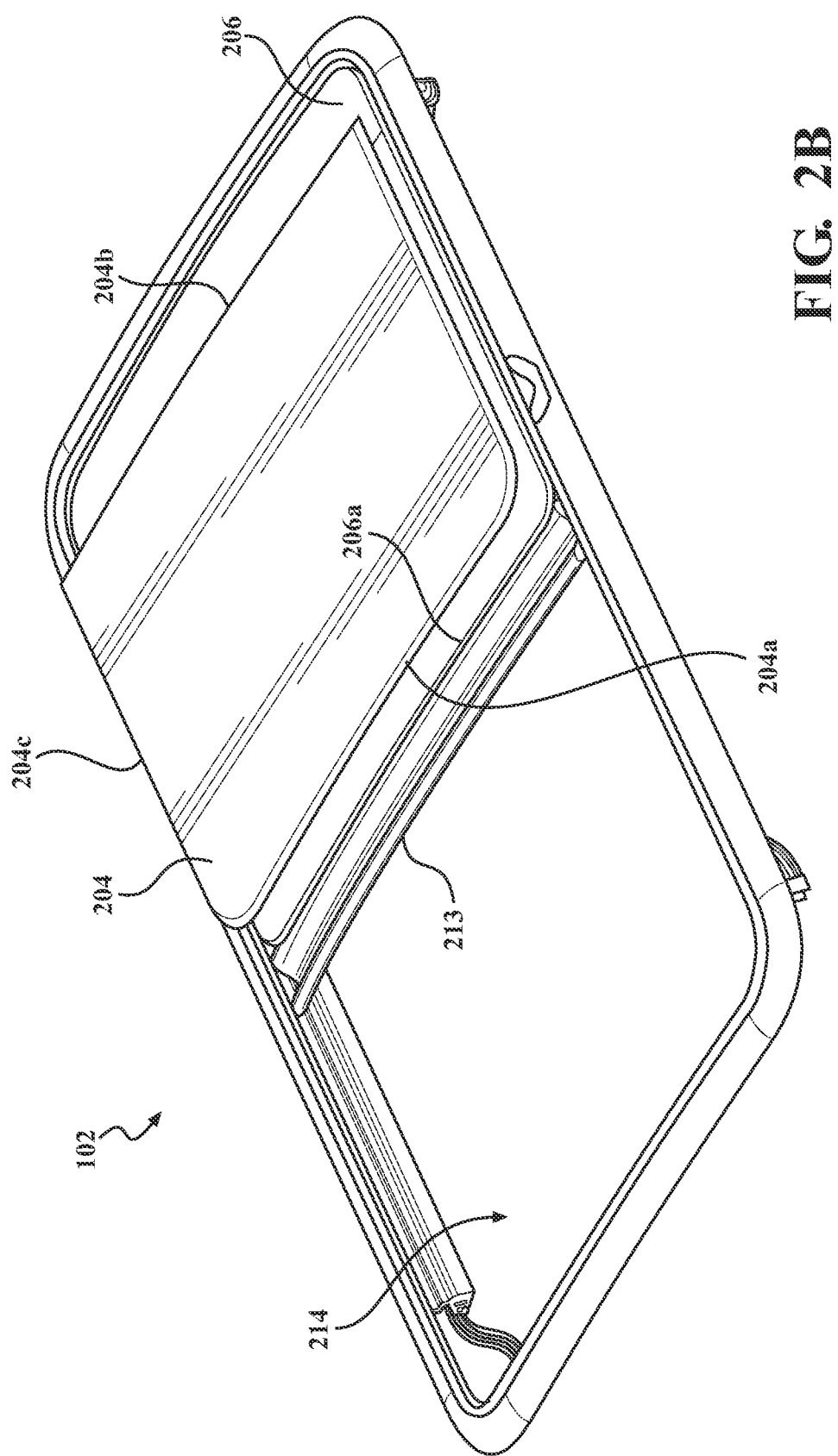
FIG. 2B is a view of the example vehicle sunroof of FIG. 2A and shows a different state of the example vehicle sunroof.
Figure 3D:
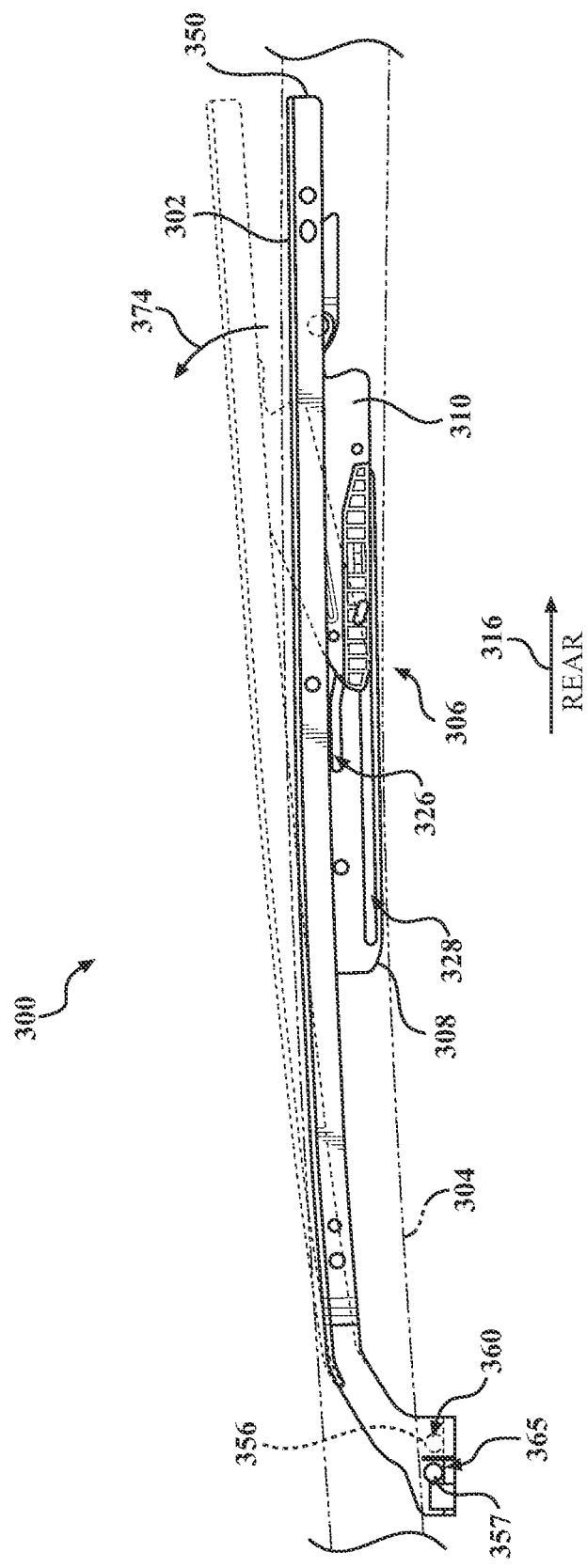

The second panel position of panel 204 can be, for example, a tilted position (as shown in FIG. 3D) or a raised position of the first panel 204 corresponding to the second state of the sunroof 102. FIG. 2B is a view of the vehicle sunroof 102 of FIG. 2A and shows one example of the second state of the vehicle sunroof 102. In particular, the vehicle sunroof 102 of FIG. 2B substantially exposes the vehicle cabin 108 to an outside environment. For example, the fluid(s) may pass into the vehicle cabin 108 through an example opening 214 in the sunroof 102 resulting from the first panel 204 moving away from the first panel position.

In some examples, the first panel 204 can slide over or under the second panel 206 to open the sunroof 102 (e.g., see FIG. 2B). In one or more arrangements, when the first panel 204 is moved from its open position as far as it can go in an opening direction of the first panel 204 (e.g. the direction labelled "REAR" in FIG. 2A) while residing above (or below) the second panel 206, the first panel 204 is considered to be in a fully open position of the panel 204. For example, the second panel 206 in FIG. 2B is shown in its fully open position. While FIG. 2B depicts the first and second panels 204, 206 overlapping and being substantially parallel relative to each other when the first panel 204 is in the second panel position, in some examples, the second panel position can correspond to a different or intermediate state (e.g., a vented state) of the sunroof 102, wherein the first panel 204 is adjacent and substantially tilted relative to the second panel 206 as shown in FIG. 3D.

Although FIGS. 2A and 2B depict aspects in connection with translating the first panel 204, in some examples, such aspects likewise apply to the second panel 206. For example, the second panel 206 can be similarly configured to move to provide an opening in the sunroof 102. Thus, in some examples, the second panel 206 of FIG. 2A is likewise movable and/or configured to move between an associated first panel position and second panel position. In such examples, the first and second assemblies 208, 210 may be operatively coupled to the second panel 206. Alternatively, the sunroof 102 may be provided with one or more additional assemblies, different from the first and second assemblies 208, 210, that is/are operatively coupled to the second panel 206 to likewise guide and/or control movement thereof.

Figure 10:
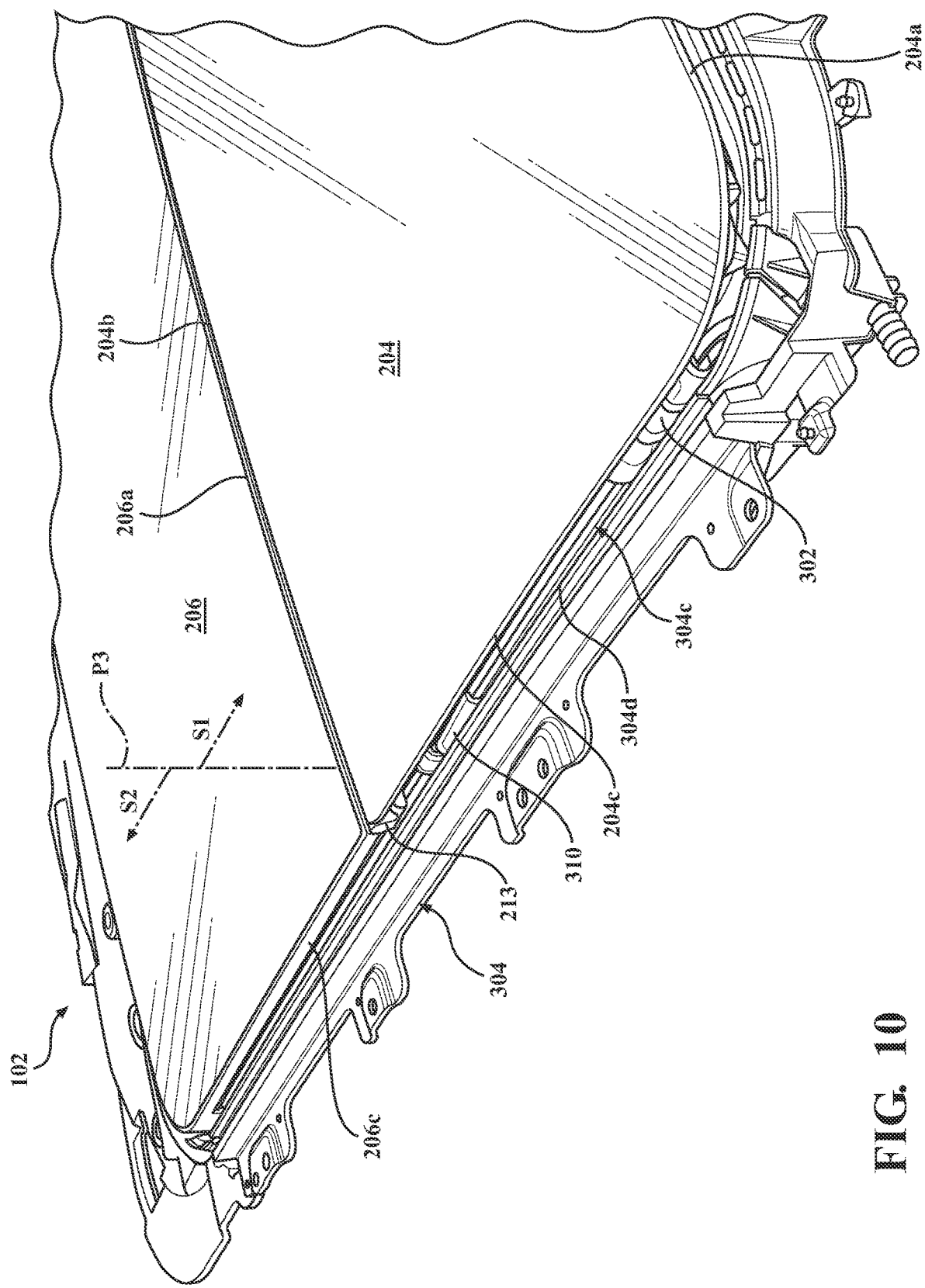
FIG. 10 is a schematic partial perspective view of a sunroof embodiment incorporating elements of the sunroof motion control mechanism described herein, with the sunroof shown in a closed state.
Figure 11:
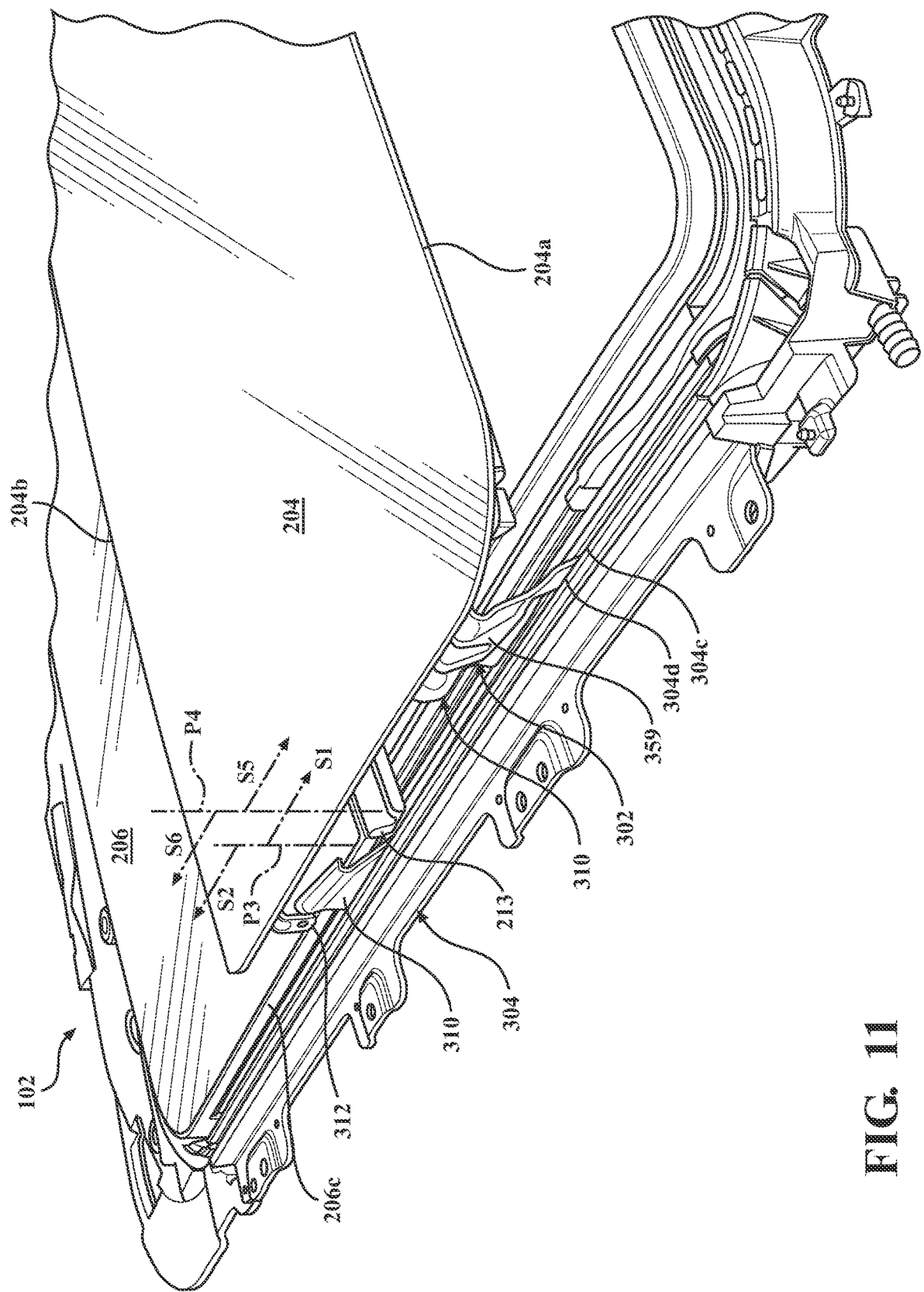
FIG. 11 is the view of FIG. 10, showing the sunroof in a partially open condition (i.e., in the process of opening) after the first sunroof panel has been elevated above the level of the second sunroof panel.
Figure 12:
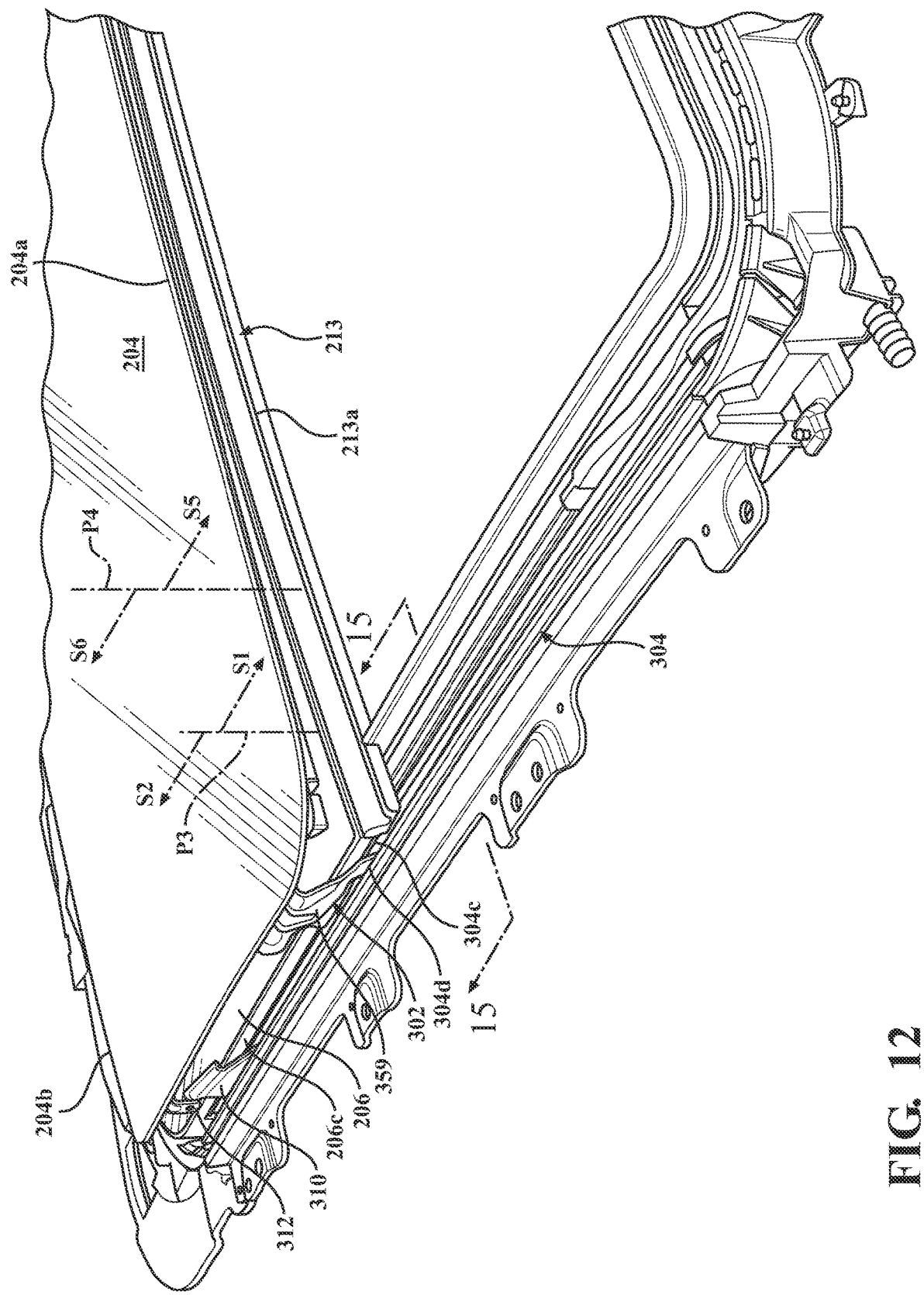
FIG. 12 is the view of FIG. 11, showing the sunroof with the first sunroof panel in the fully open position.

Referring to FIGS. 2B, 10, 11, 12, 14, and 15, in one or more arrangements, a structure (generally designated 213) may extend in a direction leading from the second sunroof panel lateral edge 206a toward the first sunroof panel second lateral edge 204b when the first sunroof panel 204 is in its closed position. The structure 213 may be interposed between the first and second sunroof panels and in direct physical contact with the first and second sunroof panels, or may otherwise physically contact both of the first and second panels 204, 206. In some arrangements, the structure 213 may be a seal or weatherstrip attached to the second sunroof panel 206 adjacent or along the lateral edge 206a of the second sunroof panel 206, to seal a seam formed between the first and second sunroof panels 204, 206 when the first sunroof panel 204 is in its closed position. In some arrangements, the seal 213 may have an edge 213a spaced apart from the second sunroof panel lateral edge 206a in a direction toward the first sunroof panel 204 when the first sunroof panel is in the closed position. The seal 213 may provide a barrier operating to prevent entry of dirt, moisture, wind, etc., through the seam and into the vehicle passenger compartment. FIGS. 2B, 10, 11, 12, 14, and 15 show one example of such a seal extending along the lateral edge 206a of the second sunroof panel 206. In one or more arrangements, as seen in FIGS. 2B and 12, a lateral edge 213a of the seal 213 spaced farthest apart from the second sunroof panel lateral edge 206a and in a forward direction of the vehicle may define a boundary of the sunroof opening when the first panel 204 is in its fully open position. In other arrangements not including a seal as described or including a different seal configuration, the second sunroof panel lateral edge 206a may define a boundary of the sunroof opening 214 when the first panel 204 is in its fully open position.

As previously mentioned, the sunroof 102 of FIG. 2A is in the first state. As such, the first panel 204 of FIG. 2A is in a respective first panel position, and/or the second panel 206 of FIG. 2A is in a respective first panel position. To facilitate translating the panel(s) 204, 206 and/or controlling positions thereof, the sunroof 102 is provided with one or more exemplary assemblies 208, 210, two of which are shown. For example, in FIG. 2A, a first assembly (e.g., a single link assembly) 208 is associated with translating a first side of the first panel 204, while a second assembly (e.g., a single link assembly) 210 is associated with translating a second side of the first panel 204 opposite to the first side. As will be discussed in greater detail below, each of the assemblies 208, 210 include one or more particular sunroof components that function cooperatively to adjust a position and/or an orientation of the first panel 204 based on motor output. Such component(s) include, but are not limited to, any of an adjustable bracket, a slidable shoe, a rotatable link, a guide block, a rail, a cable, and the like, any other suitable component(s) associated with sunroof operation, or a combination thereof. For example, an adjustable bracket (e.g., the example bracket 302 described below) may be arranged along a side of the first panel 204 and coupled to the side, where the adjustable bracket provides support to and/or holds the first panel 204 or at least the side thereof. In another example, a sunroof rail (e.g., the example rail 304 described below) may extend in a length direction of the vehicle 100 across a certain dimension (e.g., a length) 211 of the sunroof 102 or at least part of the dimension 211, which provides one or more paths or guideways along which movable sunroof components can travel.

In some examples, when the motor(s) 106 generate output, the first and second assemblies 208, 210, together, advantageously guide the first panel 204 of FIG. 2A between the first and second panel positions. Additionally, when the motor(s) 106 cease generating the output, the first and second assemblies 208, 210, together, can effectively hold the first panel 204 in one of the first panel position, the second panel position, or a different panel position, where the first panel 204 is substantially immobile (e.g., until subsequent motor output is generated). In such examples, each assembly 208, 210 or at least part thereof is connected to the motor(s) 106 to receive the output therefrom, for example, via one or more cables, belts, chains, etc. that extend from the motor(s) 106 to a movable component of the assembly 208, 210.

Additionally, the first assembly 208 and/or the second assembly 210 can be advantageously utilized to secure the first panel 204 in the presence of relatively high panel forces associated with causing panel or bracket deflection. In certain driving scenarios, one or more external forces (e.g., any of suction forces, impact forces, etc.) 212 may be applied to the first panel 204 while the sunroof 102 is closed or in the first state, which urges the first panel 204 to move and/or deflect along with the sunroof component(s) connected to the first panel 204. Such force(s) 212 can be generated, for example, as a result of the vehicle 100 driving at relatively high speeds and/or during a vehicle rollover event. In some examples, to protect weatherstrips 213 and/or other fluid seals or sealing devices of the sunroof 102, the first and second assemblies 208, 210, together, are structured to counteract the external force(s) 212, such that the panel or bracket deflection is substantially reduced and/or eliminated while the sunroof 102 is in the first state.

FIGS. 3A, 3B, 3C, 3D, and 3E are detailed views of an example assembly 300 for a sunroof of a vehicle in accordance with the teachings of this disclosure. In some examples, the assembly 300 of FIGS. 3A, 3B, 3C, 3D, and 3E corresponds to and/or can be used to implement one or more of the assemblies previously described such as, for example, the first assembly 208 and/or the second assembly 210. According to the illustrated examples of FIGS. 3A, 3B, and 3C, the assembly 300, when assembled, forms and/or defines the sunroof 102 or at least part thereof. The assembly 300 shown is sometimes referred to as a vehicle sunroof assembly and/or a sunroof assembly.

Turning to FIG. 3A, an exploded top-view of the assembly 300 is shown. The assembly 300 of FIG. 3A includes an example bracket (e.g., a function bracket of a sunroof) 302 supporting and/or configured to hold a sunroof panel, such as the first or second panel 204, 206. The bracket 302 can be arranged along a side of the sunroof panel 204, 206 and fixedly coupled to the sunroof panel 204, 206, for example, via one or more fasteners and/or fastening methods or techniques. The bracket 302 of FIG. 3A is adjustable and sometimes referred to as an adjustable bracket. Accordingly, the bracket 302 can be adjusted between different positions and/or orientations, for example, by applying certain forces to the bracket 302 in a substantially controlled manner, which changes the position of the sunroof panel 204, 206 and/or changes the state of the sunroof 102.

Figure 9:
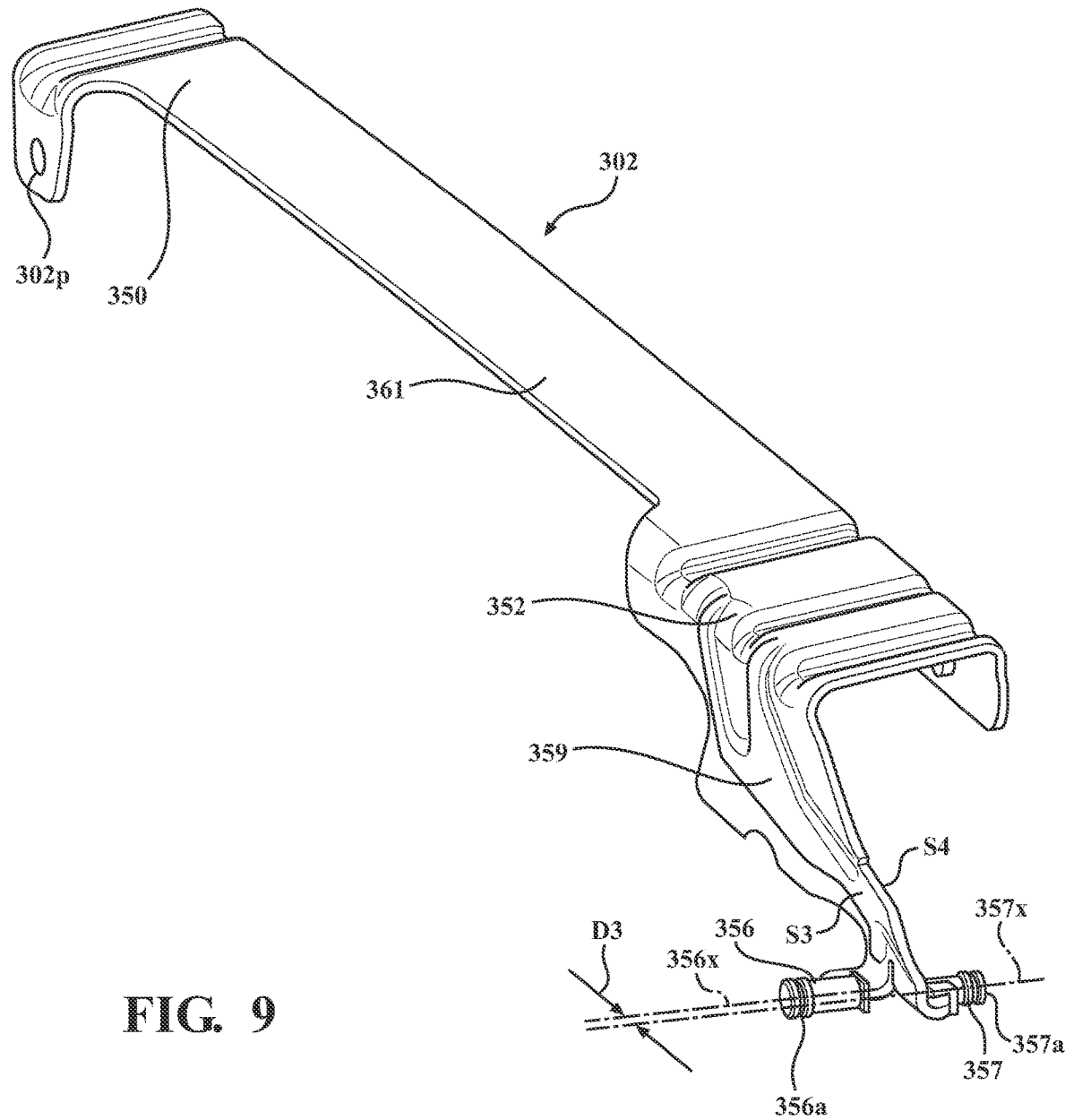
FIG. 9 is a schematic perspective view of a bracket in accordance with an embodiment described herein.

The bracket 302 may be arranged beneath the longitudinal edge 204c of the sunroof panel 204 or along an area adjacent the longitudinal edge 204c and extending across the length of the sunroof panel 204. FIG. 9 is a schematic perspective view of one embodiment of the bracket 302. In one or more arrangements, the bracket may include a base portion 361 which may extend at least partially across a length of the sunroof panel 204. Additionally, the bracket 302 may be connected to the sunroof panel 204, for example, directly and/or via one or more intermediate components interposed between the bracket base portion 361 and the sunroof panel 204, such that the bracket 302 provides support to the sunroof panel 204 or at least the longitudinal edge 204c thereof. For example, the sunroof panel 204 may be fixedly coupled to the bracket base portion 361 via one or more fasteners and/or one or more fastening methods or techniques.

Figure 15:
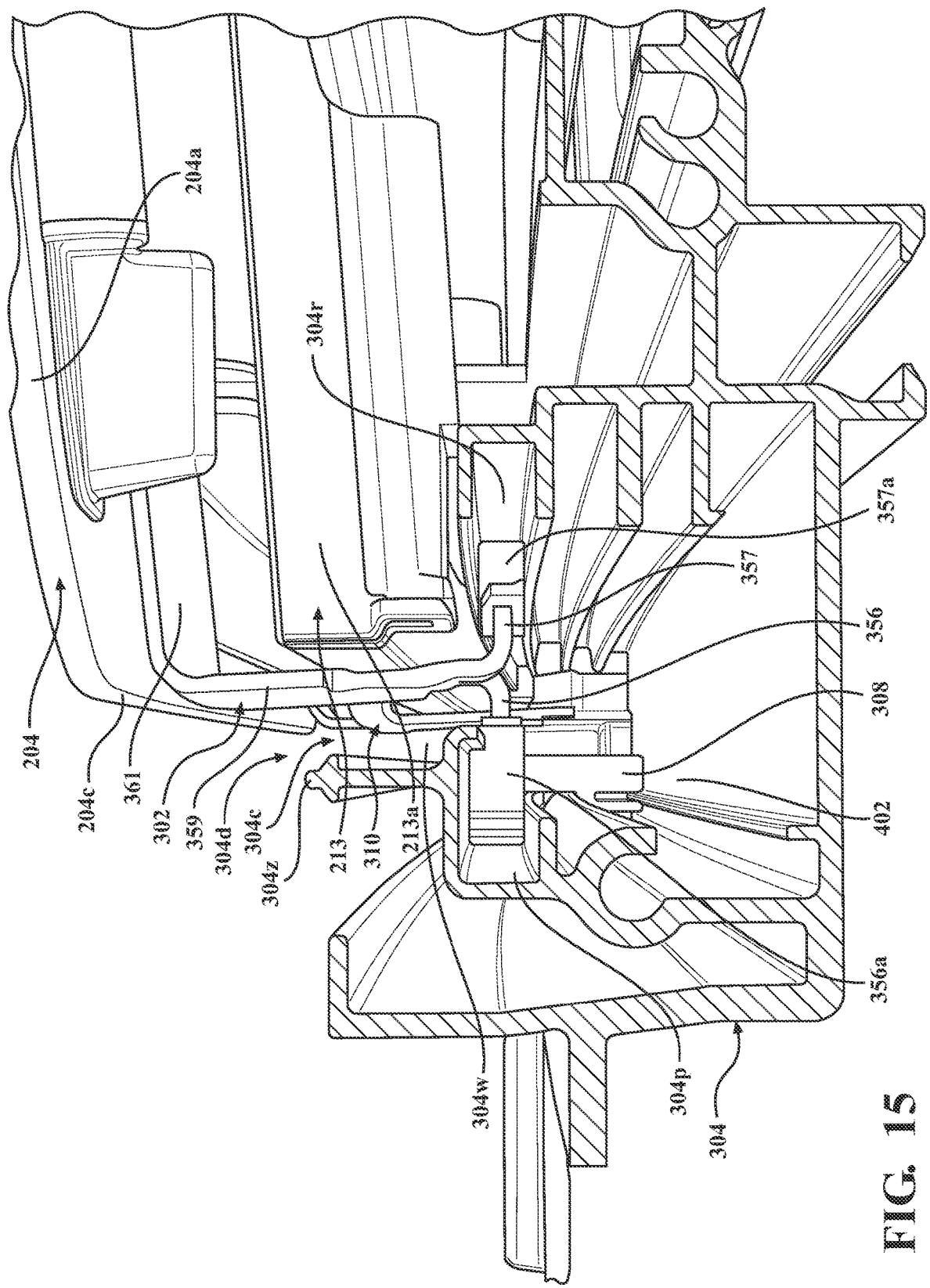
FIG. 15 is a cross-sectional view of the example assembly along line 15-15 of FIG. 12 when the first sunroof panel is in the fully open position, showing the positioning of various drive mechanism elements in associated guide tracks along the rail.

To facilitate providing support and/or guidance to the bracket 302 and related component(s), the assembly 300 of FIG. 3A includes an example longitudinal track or rail 304, as represented by the dotted/dashed lines of FIG. 3A. An end view of the rail 304 is shown in FIG. 15, which also shows the relative positions of various sunroof assembly components as described herein. The rail 304 of FIGS. 3A and 15 is positionable on the roof 202 of the vehicle 100 and/or can be fixedly coupled to the roof 202, for example, via one or more fasteners and/or one or more fastening methods or techniques. When installed on the roof 202, the rail 304 may extend in the length direction of the vehicle 100. In particular, the rail 304 of FIG. 3A forms and/or defines at least one guideway extending across a length of the rail 304 or part thereof to receive and guide one or more movable sunroof components, as discussed in greater detail below.

As described herein, and as may be seen in FIGS. 4A-4C, 11, 12, and 15, the rail 304 may define a generally vertically-extending cavity 304c into which portions of the bracket 302 and link 310 extend. The cavity 304c may include an opening 304d through which elements of the sunroof assembly may extend into the cavity or out of the cavity. The rail 304 may also define various guide tracks or guide channels (such as primary guide channel 402 (described below) for drive shoe 308) extending adjacent the cavity 304c and intersecting the cavity 304c.

Certain elements of the drive mechanism 306 (e.g., at least link 310, drive shoe 308, and first guide block 334), operation of the drive mechanism, and interactions between elements of the drive mechanism and the first sunroof panel 204 to tilt and move the first sunroof panel 204 between a closed position to a fully open position as described herein are the same or substantially the same as similar elements, operations, and interactions of sunroof assembly embodiments described in U.S. Pat. No. 11,318,825, the disclosure of which is incorporated herein by reference in its entirety.

According to the illustrated example of FIG. 3A, the assembly 300 can be provided with an example drive mechanism (e.g., a motor-driven drive mechanism) 306 that is slidably coupled to the rail 304, which facilitates tilting, raising, lowering, and/or otherwise translating the bracket 302 and the panel held by the bracket 302. In FIG. 3A, the drive mechanism 306 is provided with an example drive shoe 308 and an example link (e.g., a link bracket) 310 that is operatively connected to the drive shoe 308 and the bracket 302. The link 310 is pivotably coupled to the bracket 302, for example, via a first movable joint (e.g., a pin joint) 312 formed and/or defined by the link 310 and the bracket 302. As such, the link 310 and the bracket 302 can pivot or rotate relative to each other about the first movable joint 312 or a first axis 314 associated with the first movable joint 312. Additionally, the drive shoe 308 is configured to slidably couple to the link 310, for example, via a pin and slot connection or interface formed and/or defined by the drive shoe 308 and the link 310. The drive shoe 308 and/or, more generally, the drive mechanism 306 of FIG. 3A may be driven by at least one of the motor(s) 106.

The drive mechanism 306 of FIG. 3A, when assembled, is changeable and/or configured to change between different states such as, for example, a first state (e.g., a sliding state) of the drive mechanism 306 and a second state (e.g., a dragging state) of the drive mechanism 306 different from the first state. When the drive mechanism 306 is in the first state, the drive shoe 308 is movable relative to the link 310, where the drive shoe 308 can slide against one or more pins on the link 310 to adjust a relative orientation of the link 310 in a controlled manner. As will be discussed in greater detail below, movement of the drive shoe 308 relative to the link 310 changes the relative orientation of the link 310 and, as a result, changes a relative orientation of the bracket 302 and the panel held by the bracket 302. In some examples, the drive shoe 308 can be moved (e.g., via the motor(s) 106) along the rail 304 relative to the link 310 in a first direction (e.g., a rear or rearward direction) 316 and/or a second direction (e.g., a front or forward direction) 318 opposite to the first direction 316. On the other hand, when the drive mechanism 306 is in the second state, the relative orientation of the link 310 and a position of the link 310 relative to the drive shoe 308 are substantially fixed, where the drive shoe 308 can drag or pull the link 310 and the bracket 302 across the rail 304 in the length direction of the vehicle 100. That is, the link 310 and the drive shoe 308 substantially lock together when the drive mechanism 306 is in the second state. In such examples, the drive shoe 308, the link 310, and the bracket 302 can move cooperatively together or in tandem in the first or second direction 316, 318 based on the output of the motor(s) 106. Each of the drive shoe 308 and the link 310 can be disposed in a guide channel or slot of the rail 304 and/or configured to slide through the rail 304 to receive guidance from the rail 304 during sunroof operation (e.g., see FIG. 15).

In some examples, to facilitate precisely controlling link movement, the link 310 is provided with one or more pins associated with the drive shoe 308, two of which are shown in this example. In FIG. 3A, a first pin (e.g., a rear pin) 320 coupled to the link 310 projects from a first side 322 of the link 310, which is insertable in the drive shoe 308. Additionally, a second pin (e.g., a front pin) 324 coupled to the link 310 projects from the first side 322 of the link 310, which is similarly insertable in the drive shoe 308. In such examples, the drive shoe 308 is configured to receive the pin(s) 320, 324 in one or more respective slots extending through the drive shoe 308 to guide movement of the pin(s) 320, 324 during sunroof operation. For example, the first pin 320 can slide through a first slot 326 (shown in FIG. 3D) in the drive shoe 308, while the second pin 324 can slide through a second slot 328 (shown in FIG. 3D) in the drive shoe 308 different from the first slot 326. In particular, the second pin 324 of FIG. 3A is a pivot point of the link 310, wherein a second axis (e.g., a rotation axis) 329 of the link 310 about which the link 310 can rotate is provided by engagement of the second pin 324 and one or more internal surfaces of the drive shoe 308.

To enable operation of the drive mechanism 306, the drive shoe 308 can be connected to at least one of the motor(s) 106, for example, via a cable, a belt, and the like, and/or any other suitable component(s) capable of transmitting energy from the motor(s) 106 to the drive shoe 308. In some examples, the drive shoe 308 is connected to the motor(s) 106 via a cable 330 (and the like) extending from the drive shoe 308 to the motor(s) 106, where tension in the cable 330 is utilized to pull the drive shoe 308 along the rail 304. In such examples, a first example receiver (e.g., a cable receiver) 332 attached to the drive shoe 308 can be coupled to the cable 330. Accordingly, energy is transmittable through the cable 330 of FIG. 3A from the motor(s) 106 to the drive shoe 308. In some examples, output of the motor(s) 106 creates tension in the cable 330, thereby moving the drive shoe 308 in the first direction 316 and/or the second direction 318.

Additionally, to facilitate transitioning the drive mechanism 306 between the first and second states and/or maintaining the drive mechanism 306 in the first state, the assembly 300 can be provided with an example first guide block 334. The first guide block 334 of FIG. 3A is attached to a part of the rail 304 that is between a first end (e.g., a rear end) 336 of the rail 304 and a second end (e.g., a front end) 338 of the rail 304 opposite to the first end 336. The first guide block 334 may be fixedly coupled to the rail 304, for example, via one or more fasteners and/or one or more fastening methods or techniques.

In some examples, the first guide block 334 can receive the link 310 and removably connect to the link 310, for example, via a pin and slot connection or interface that is formed and/or defined by the first guide block 334 and the link 310. In such examples, the link 310 is configured to connect the first guide block 334 and disconnect from the first guide block 334 based on an orientation of the link 310 relative to the first guide block 334. In particular, when connected together, the first guide block 334 is structured to prevent the link 310 and the bracket 302 from translating along the rail 304 in the first direction 316 until a certain or target orientation of the link 310 is achieved (e.g., see FIG. 3E). As will be discussed further below, one or more pins on the link 310 can slide against the guide block 334 to substantially maintain the position of the link 310 relative to the drive shoe 308, while allowing for changes in the relative orientation of the link 310. When the target orientation of the link 310 is achieved, the link 310 and the first guide block 334 can separate from each other as the drive shoe 308 pulls the link 310 and the bracket 302 in the first direction 316 to fully open the sunroof 102.

The link 310 of FIG. 3A may be provided with one or more pins associated with the first guide block 334, two of which are shown in this example. In some examples, a third pin 340 coupled to the link 310 projects from a second side 342 of the link 310, which is insertable in the first guide block 334. Additionally, a fourth pin 344 coupled to the link 310 projects from the second side 342 of the link 310, which is similarly insertable in the first guide block 334. The second side 342 of the link 310 is opposite to the first side 322 of the link 310. As such, the third and fourth pins 340, 344 of FIG. 3A are positioned on the link 310 opposite relative to the first and second pins 320, 324. In such examples, the first guide block 334 is configured to receive the pin(s) 340, 344 in one or more respective slots extending through the first guide block 334 to guide movement of the pin(s) 340, 344 during sunroof operation. For example, the third pin 340 can slide through a third slot 346 (shown in FIG. 3B) in the first guide block 334 to provide support to the link 310 as the link 310 rotates relative to the drive shoe 308 and the first guide block 334, while the fourth pin 344 can slide through a fourth slot 348 (shown in FIG. 3B) in the first guide block 334 different from the third slot 346 to provide support to the link 310 as the link 310 rotates relative to the drive shoe 308 and the first guide block 334.

Figure 8:
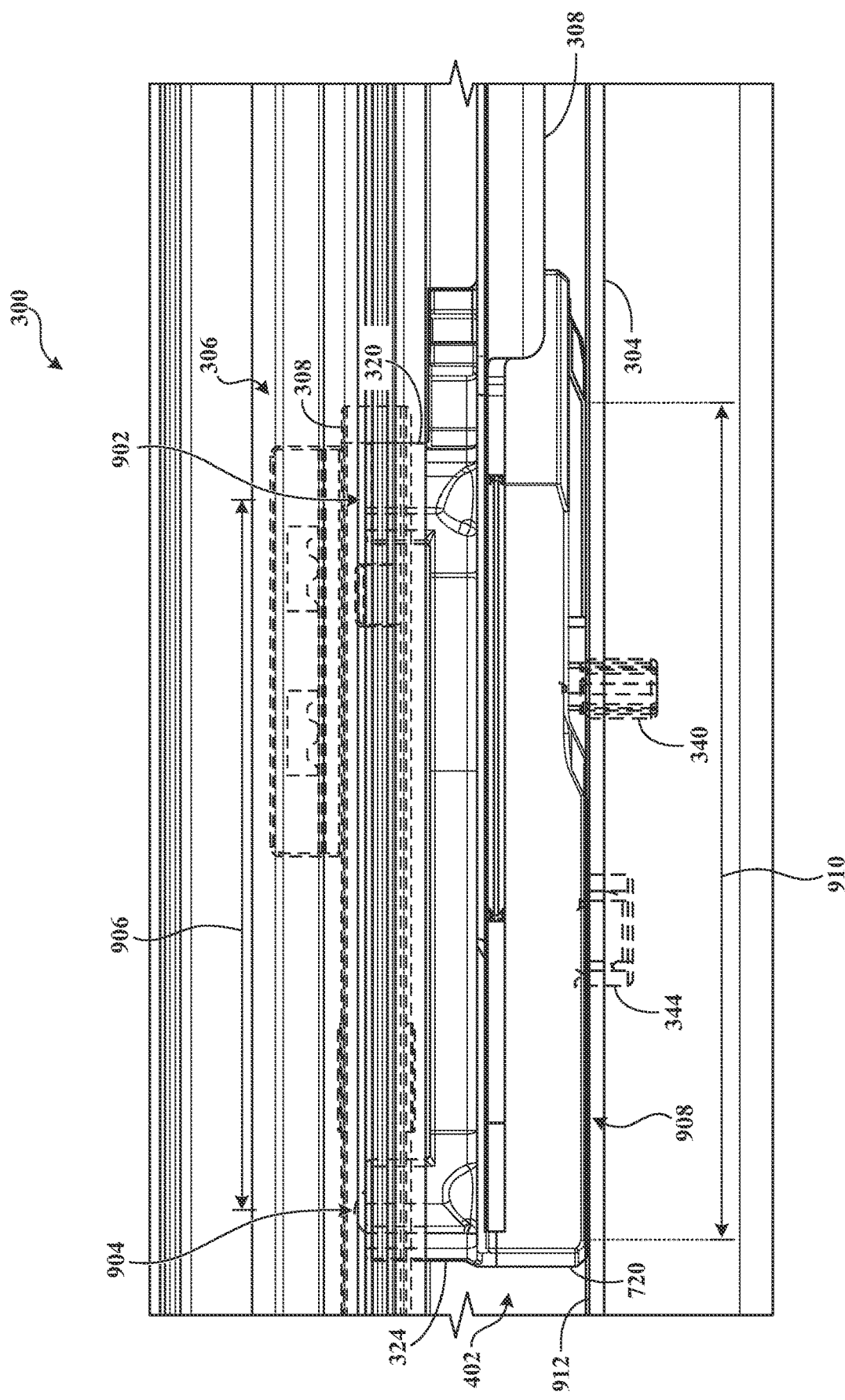
FIG. 8 is a top-view of the example assembly and shows an example drive mechanism positioned in an example sunroof rail.

As previously mentioned, the bracket 302 may pivot relative to the link 310 about the first movable joint 312. As such, a point at which the bracket 302 and the drive mechanism 306 connect is a first pivot point of the bracket 302. As seen in FIGS. 3A and 8, the bracket 302 may have a base portion 361 including a first end 350 (e.g., a rear end) and a second end (e.g., a front end) 352 opposite to the first end 350. The base portion 361 may be attached to the first sunroof panel 204 so that the first sunroof panel 204 moves with the base portion 361/bracket 302. In FIG. 3A, a first end 349 of the link 310 is pivotably coupled to a part of the bracket 302 that is at the first end (e.g., a rear end) 350 of the bracket 302. Additionally, in some examples, the second end 352 of the bracket 302 defines second and third pivot points of the bracket 302 that are spaced from the first pivot point. For example, as the drive mechanism 306 actuates, the bracket 302 of FIGS. 3A and 8 is configured to pivot about the second and third pivot points relative to the rail 304 to change the state of the sunroof 102. In such examples, a bracket support portion 359 may extend from the base portion 361 at or proximate the base portion second end 352. The support portion 359 may be structured to extend from the base portion 361/first panel 204 into the rail cavity opening 304d and to operably connect to the rail 304 so as be movable along the rail cavity opening 304d as described herein, during movement of the first sunroof panel 204 between the first panel position and the second panel position. The term "operably connected," as used throughout this description, can include direct or indirect connections, including connections without direct physical contact.

To this end, referring to FIG. 9, the bracket support portion 359 may include a pair of projections or pins 356 and 357 extending therefrom. Each of projections or pins 356 and 357 may be structured to slidably and rotatably engage one or more associated guide channels formed in the rail 304 or adjacent the rail, so as to slidably and rotatably couple the bracket 302 to the rail. Thus, each of pins 356 and 357 may slide and rotate within one or more respective guide channels extending along or adjacent the rail as the first sunroof panel 204 changes its orientation and moves from the first panel position to the second panel position. As seen in FIGS. 3A and 9, the pins 356 and 357 may be oppositely-extending (i.e., the pins 356 and 357 may extend in opposite directions from the bracket support portion 359). The pins 356 and 357 may also be longitudinally-staggered (i.e., the pins may be arranged so as to have non-collinear longitudinal and/or central axes 356x and 357x of extension from the bracket support portion 359, with the axes 356x and 357x being staggered along a length direction of the vehicle when the assembly 300 is installed in the vehicle). The provisions of pins extending to opposite sides of the bracket 302 may aid in stabilizing and supporting the bracket 302 responsive to lateral forces (for example, due to wind) acting on the sunroof.

More specifically, in one or more arrangements, a fifth pin 356 may project from a first side S3 of the bracket support portion 359 and may be receivable by a second guide block (e.g., a front guide block) 358 (shown in FIG. 3C), different from the first guide block 334, that may be formed into the structure of the rail or coupled to the rail 304 at or adjacent the second end 338 of the rail 304 so as to form part of the rail structure. The fifth pin 356 of FIGS. 3A and 9 may be configured to rotatably and/or slidably engage the second guide block 358, thereby providing a second movable joint (e.g., a pin joint) 360 for the bracket 302 different from the first movable joint 312, and which slidably and rotatably couples the bracket 302 to the rail 304. Additionally, the fifth pin 356 and the second guide block 358, together, can be configured to raise and/or lower the second end 352 of the bracket 302, as discussed further below.

Similarly, referring again to FIG. 9, a sixth pin 357 may extend from a second side S4 of the bracket support portion 359 opposite the first side S3 and may be receivable by a third guide block (e.g., another front guide block) 363 (shown in FIG. 3C), different from and positioned generally opposite the second guide block 358, that may be coupled to the rail 304 at or adjacent the second end 338 of the rail 304 so as to form part of the rail structure. The sixth pin 357 of FIGS. 3A and 9 may be configured to rotatably and/or slidably engage the third guide block 363, thereby providing a third movable joint (e.g., a pin joint) 365 for the bracket 302 different from the second movable joint 360, and which slidably and rotatably couples the bracket 302 to the rail 304. Additionally, the sixth pin 357 and the third guide block 363, together, can be configured to raise and/or lower the second end 352 of the bracket 302 in conjunction with the second guide block 358, as discussed further below.

Referring to FIG. 9, to facilitate sliding of the bracket pin 356 along the rail 304 during operation of the sunroof 102, a polymeric overmold 356a may be applied to an end of the pin 356 structured to engage an associated guide channel in (or adjacent) the rail 304. Also, to facilitate sliding of the bracket pin 357 along the rail 304 during operation of the sunroof 102, a polymeric overmold 357a may be applied to an end of the pin 357 structured to engage an associated guide channel in (or adjacent) the rail 304.

Turning to FIG. 3B, a detailed view of the first guide block 334 is shown in which the first guide block 334 is attached to the rail 304. In particular, a cross-sectional area of the rail 304 along line A-A of FIG. 3A is shown in the illustrated example of FIG. 3B. In FIG. 3B, the first guide block 334 is slidably engaged with the link 310. More particularly, the link 310 is removably connected to the first guide block 334 via the third and fourth pins 340, 344. As previously described, the first guide block 334 can be provided with one or more slots for guiding movement of the pin(s) 340, 344 on the link 310, two of which are shown in this example (i.e., the third slot 346 and the fourth slot 348). In some examples, the first guide block 334 includes a body (e.g., a relatively small, block-shaped body) in which the third and fourth slots 346, 348 are positioned. In such examples, the third slot 346 extends through the body and is configured to receive the third pin 340, and the fourth slot 348 extends through the body and is configured to receive the fourth pin 344. In FIG. 3B, the third pin 340 is in the third slot 346 and abutting one or more internal surfaces of the first guide block 334 defining the third slot 346, while the fourth pin 344 of FIG. 3B is in the fourth slot 348 and abutting one or more internal surfaces of the first guide block 334 defining the forth slot 348.

According to the illustrated example of FIG. 3B, as the relative orientation of the link 310 changes, the third and fourth pins 340, 344 slide through the respective third and fourth slots 346, 348 away from a bottommost (in the orientation of FIG. 3B) portion of the first guide block 334 toward a topmost (in the orientation of FIG. 3B) portion of the first guide block 334. In some examples, each of the third and fourth pins 340, 344 remain substantially engaged with the internal surface(s) of the first guide block 334 during such movement of the link 310, which reduces and/or eliminates unwanted noise typically associated with sunroof operation. Further, as the link 310 reaches the target orientation thereof, the third pin 340 enters a topmost section of the third slot 346, where the third pin 340 can exit the third slot 346 and enter a fifth slot 364 in the rail 304 in a controller manner. Similarly, the fourth pin 344 enters a topmost section of the fourth slot 348 as the link 310 reaches the target orientation thereof, where the fourth pin 344 can exit the fourth slot 348 and enter a sixth slot 366 in the rail 304 in a controller manner. As such, the rail 304 can be provided with at least two slots 364, 366 for further guiding movement of the respective third and fourth pins 340, 344 after the third and fourth pins 340, 344 exit the first guide block 334. The fifth slot 364 is adjacent the third slot 346 and/or connected to the third slot 346, such that the third pin 340 can easily pass between the third and fifth slots 346, 364. Similarly, the sixth slot 366 is adjacent the fourth slot 348 and/or connected to the fourth slot 348, such that the fourth pin 344 can easily pass between the fourth and sixth slots 348, 366.

Turning in detail to FIG. 3C, a detailed view of the second guide block 358 is shown in which the second guide block 358 is attached to the rail 304. In particular, a cross-sectional area of the rail 304 along line B-B of FIG. 3A is shown in the illustrated example of FIG. 3C. Generally speaking, the assembly 300 can include the second guide block 358 to facilitate raising and/or lowering the second end 352 of the bracket 302. In some examples, the second guide block 358 is fixedly coupled to the rail 304, for example, via one or more fasteners and/or one or more fastening methods or techniques. Further, the second guide block 358 of FIG. 3C is slidably engaged with the fifth pin 356 on the guide block 358 to create the second movable joint 360 and/or the second pivot point about which the bracket 302 can pivot.

In FIG. 3C, the second guide block 358 is provided with at least one slot for guiding movement of the fifth pin 356. In some examples, a seventh slot 368 extending through the second guide block 358 can be configured to receive the fifth pin 356 and guide the fifth pin 356 through a part of the second guide block 358. In FIG. 3C, the fifth pin 356 is in the seventh slot 368 adjacent an end of the seventh slot 368 and abutting one or more internal surfaces of the second guide block 358 that define the seventh slot 368. In such examples, movement of the fifth pin 356 through the seventh slot 368 urges the second end 352 of the bracket 302 to move in an upward direction and/or a downward direction. Additionally, the rail 304 of FIG. 3C can be provided with at least one slot for further guiding movement of the fifth pin 356. For example, an eighth slot 370 extending through the rail 304 is configured to receive the fifth pin 356 after the fifth pin 356 exits the second guide block 358. The eighth slot 370 is adjacent the seventh slot 368 and/or connected to the seventh slot 368, such that the fifth pin 356 can easily pass between the seventh and eighth slots 368, 370.

In FIG. 3C, the seventh slot 368 is substantially curved and/or inclined, which facilitates controlling a height position of the fifth pin 356 as well as a height position of the second end 352 of the bracket 302. On the other hand, the eighth slot 370 is substantially linear, which facilitates maintaining the height position of the fifth pin 356 as well as the height position of the second end 352 of the bracket 302. In some examples, as the fifth pin 356 of FIG. 3C travels through the seventh slot 368 toward the eighth slot 370 in the rail 304, the internal surface(s) of the second guide block 358 impart a force or load on the fifth pin 356 having a vertical force component that urges the second end 352 of the bracket 302 to rise. As the fifth pin 356 continues traveling in the same direction, the fifth pin 356 exits the seventh slot 368 and enters the eighth slot 370, where the rail 304 slidably supports the fifth pin 356. While the fifth pin 356 is positioned in the eighth slot 370, the rail 304 imparts a force or load on the fifth pin 356 that substantially maintains the second end 352 of the bracket 302 in a raised positioned, while allowing the fifth pin 356 to slide horizontally along the rail 304.

Turning now in detail to FIG. 3F, a detailed view of the third guide block 363 is shown in which the third guide block 363 is attached to the rail 304. In particular, a cross-sectional area of the rail 304 along line 3F-3F of FIG. 3A is shown in the illustrated example of FIG. 3F. Generally speaking, the assembly 300 can include the third guide block 363 to facilitate raising and/or lowering the second end 352 of the bracket 302. In some examples, the third guide block 363 is fixedly coupled to the rail 304, for example, via one or more fasteners and/or one or more fastening methods or techniques. Further, the third guide block 363 of FIG. 3F is slidably engaged with the sixth pin 357 on the bracket 302 to create the second movable joint 360 and/or the second pivot point about which the bracket 302 can pivot.

In FIG. 3F, the third guide block 363 is provided with at least one slot for guiding movement of the sixth pin 357. In some examples, a ninth slot 369 extending through the third guide block 363 can be configured to receive the sixth pin 357 and guide the sixth pin 357 through a part of the third guide block 363. In FIG. 3F, the sixth pin 357 is in the ninth slot 369 adjacent an end of the ninth slot 369 and abutting one or more internal surfaces of the third guide block 363 that define the ninth slot 369. In such examples, movement of the sixth pin 357 through the ninth slot 369 urges the second end 352 of the bracket 302 to move in an upward direction and/or a downward direction. Additionally, the rail 304 of FIG. 3F can be provided with at least one slot for further guiding movement of the sixth pin 357. For example, a tenth slot 377 extending through the rail 304 is configured to receive the sixth pin 357 after the sixth pin 357 exits the third guide block 363. The tenth slot 377 is adjacent the ninth slot 369 and/or connected to the ninth slot 369, such that the sixth pin 357 can easily pass between the ninth and tenth slots 369, 377.

In FIG. 3F, the ninth slot 369 is substantially curved and/or inclined, which facilitates controlling a height position of the sixth pin 357 as well as a height position of the second end 352 of the bracket 302. On the other hand, the tenth slot 377 is substantially linear, which facilitates maintaining the height position of the sixth pin 357 as well as the height position of the second end 352 of the bracket 302. In some examples, as the sixth pin 357 of FIG. 3F travels through the ninth slot 369 toward the tenth slot 377 in the rail 304, the internal surface(s) of the third guide block 363 impart a force or load on the sixth pin 357 having a vertical force component that urges the second end 352 of the bracket 302 to rise. As the sixth pin 357 continues traveling in the same direction, the sixth pin 357 exits the ninth slot 369 and enters the tenth slot 377, where the rail 304 slidably supports the sixth pin 357. While the sixth pin 357 is positioned in the tenth slot 377, the rail 304 imparts a force or load on the sixth pin 357 that substantially maintains the second end 352 of the bracket 302 in a raised positioned, while allowing the sixth pin 357 to slide horizontally along the rail 304.

In FIG. 3D, the drive mechanism 306 is structured to adjust the bracket 302 between the first position and at least one additional position different from the first position when the output of the motor(s) 106 is applied to the drive mechanism 306, thereby at least partially opening the sunroof 102 of the vehicle 100. In some examples, the drive mechanism 306 and the motor(s) 106, together, move the bracket 302 to a second position such as, for example, a tilted position of the bracket 302, as represented by the dotted/dashed lines of FIG. 3D. Additionally or alternatively, in some examples, the drive mechanism 306 and the motor(s) 106, together, move the bracket 302 to a third position such as, for example, a fully raised position of the bracket 302 (e.g., see FIG. 3B). In particular, the first position of the bracket 302 is a position in which the vehicle sunroof 102 is closed, while the second or third position of the bracket 302 is a position in which the vehicle sunroof 102 is at least partially or fully open.

According to the illustrated example of FIG. 3D, the drive shoe 308 is slidably coupled to the link 310 via the first pin 320, the second pin 324, the first slot 326, and the second slot 328. Further, the drive mechanism 306 of FIG. 3D is in the first state thereof. Accordingly, in FIG. 3D, the drive shoe 308 is movable relative to the link 310 based on motor output applied to the drive shoe 308, and the link 310 is rotatable about the second axis 329 relative to both the drive shoe 308 and the first guide block 334. In some examples, the drive shoe 308 can be moved relative to the link 310 in the first direction 316 during a sunroof opening operation associated with opening the sunroof 102. In particular, the drive shoe 308 of FIG. 3D can slide along the rail 304 from a first position (e.g., an initial drive shoe position) relative to the link 310 (as shown in FIG. 3D) to at least one additional position relative to the link 310 different from the first position, which causes the link 310 to rotate about the second axis 329 in a first rotational direction (e.g., counterclockwise) 374. For example, the motor(s) 106 can urge the drive shoe 308 to move to a second position relative to the link 310 such as, for example, an intermediate position (e.g., a vent position) providing the intermediate state of the sunroof 102 (e.g., see FIG. 4B). Conversely, the drive shoe 308 of FIG. 3D can be moved relative to the link 310 in the second direction 318 during a sunroof closing operation associated with closing the sunroof 102. For example, the drive shoe 308 can slide along the rail 304 from the second position back to the first position, which causes the link 310 to rotate about the second axis 329 in a second rotational direction (counterclockwise) opposite to the first rotational direction 374. In any case, the drive shoe 308 of FIG. 3D remains substantially engaged with the link 310 (e.g., the drive shoe 308 and the link 310 do not disconnect or separate during sunroof operation). Each of the positions of the drive shoe 308 relative to the link 310 is sometimes referred to as a drive shoe position.

As previously described, the drive shoe 308 can be provided with the first and second slots 326, 328 for guiding movement of the first and second pins 320, 324 on the link 310. In FIG. 3D, each of the first and second slots 326, 328 extends through the drive shoe 308 and is configured to receive a respective one of the first and second pins 320, 324. In some examples, the first slot 326 of FIG. 3D is configured to guide the first pin 320 through a part of the drive shoe 308 to control an angular motion parameter (e.g., any of an angular position, an angular velocity, and the like) of the link 310, while the second slot 328 is configured to guide the second pin 324 through a different part of the drive shoe 308 to provide and maintain the rotation axis 329 of the link 310 during sunroof operation. In FIG. 3D, the link 310 is in a first orientation in which the link 310 is inseparable from the first guide block 334. In particular, the link 310 of FIG. 3D can rotate relative to the drive shoe 308 about the second axis 329 from the first orientation to at least one additional orientation different from the first orientation such as, for example, a second orientation providing the tilted position of the bracket 302, as substantially represented by the dotted/dashed lines of FIG. 3D. Accordingly, rotation of the link 310 in the first rotational direction 374 urges the bracket 302 to rotate in the first rotational direction 374 about the second movable joint 360 (or a third axis associated therewith) and third joint 365 (or a fourth axis associated therewith) to raise the first end 350 of the bracket 302. Conversely, rotation of the link 310 in the second rotational direction urges the bracket 302 to rotate in the second rotational direction about the second movable joint 360 and the third joint 365 to lower the first end 350 of the bracket 302.

Turning to FIG. 3E, another side-view of the vehicle sunroof assembly 300 is shown. In FIG. 3E, the bracket 302 is in the third position thereof, where the first and second ends 350, 352 of the bracket 302 are substantially raised and/or even with respect to height. In contrast to the illustrated example of FIG. 3D, the drive shoe 308 moved along the rail 304 in the first direction 316 from the first position to a third position (e.g., a final drive shoe position) relative to the link 310 different from the second position. As a result, the link 310 rotated relative to the drive shoe 308 about the second axis 329 in the first rotational direction 374 from the first orientation to the target orientation in which the link 310 is separable from the first guide block 334. The link 310 of FIG. 3E can rotate across a relatively large or certain angle 378 when moving from the first orientation to the target orientation. For example, the angle 378 of FIG. 3E is about 15 degrees. In some examples, the first orientation of the link 310 provides a fully lowered position of the first end 350 of the bracket 302, and the target orientation of the link 310 provides a fully raised position of the first end 350 of the bracket 302.

In further contrast to the illustrated example of FIG. 3D, the drive mechanism 306 transitioned from the first state to the second state, and the drive shoe 308 dragged or pulled the link 310 and the bracket 302 along the rail 304 in the first direction 316 to enable the fifth pin 356 and the second guide block 358 and the sixth pin 357 and the third guide block 363 to lift the second end 352 of the bracket 302 to a height position that substantially matches a height position of the first end 350 of the bracket 302.

In FIG. 3E, the drive mechanism 306 is interposed between the bracket 302 and the rail 304, which provides support to the bracket 302 or at least the first end 350 of the bracket 302. Whereas the fifth pin 356 and sixth pin 357 associated with the second end 352 of the bracket 302 are slidably engaged with rail 304 and positioned in certain slots (e.g., in slots 370 and 377, respectively) in the rail 304, which provides support to the second end 352 of the bracket 302. As such, the bracket 302 of FIG. 3E is substantially supported by the rail 304 and the drive mechanism 306.

FIGS. 4A, 4B, and 4C are detailed views of the drive shoe 308 and show different stages (e.g., initial or beginning stages) of the previously described sunroof opening operation with respect to the drive shoe 308 and the first and second pins 320, 324 on the link 310. According to the illustrated examples of FIGS. 4A, 4B, and 4C, the drive mechanism 306 is assembled, and the drive shoe 308 is being moved (e.g., via the motor(s) 106) in the first direction 316 relative to the link 310 from the first drive shoe position to the third drive shoe position previously described. Further, the first pin 320 on the link 310 is positioned in the first slot 326 and abutting one or more internal surfaces of the drive shoe 308 that define the first slot 326, while the second pin 324 on the link 310 is positioned in the second slot 328 and abutting one or more additional internal surfaces of the drive shoe 308 that define the second slot 328. Additionally, the drive shoe 308 of FIGS. 4A, 4B, and 4C is slidably disposed in an associated guide channel 402 extending through the rail 304, where the drive shoe 308 can slide against opposing surfaces (e.g., top and bottom surfaces) 404, 406 of the rail 304 that define the primary guide channel 402.

In FIGS. 4A, 4B, and 4C, the first slot 326 and the second slot 328 are sized and/or shaped in connection with precisely controlling, via the first and second pins 320, 324, relative movement of the link 310 during sunroof operation. In some examples, the first slot 326 and the pin 320, together, facilitate controlling one or more angular motion parameters of the link 310 during sunroof operation such as, for example, any of an angular position of the link 310, an angular speed of the link 310, and the like. Additionally, in some examples, the second slot 328 and the second pin 324, together, facilitate providing and substantially maintaining the second axis 329 of the link 310 during sunroof operation.

Turning to FIG. 4A, a first or initial stage of the sunroof opening operation is shown. According to the illustrated example of FIG. 4A, the drive shoe 308 is in the first position thereof relative to the link 310, where the first pin 320 is positioned substantially at a first end 408 of the first slot 326 and the second pin 324 is positioned substantially at a first end 410 of the second slot 328. In FIG. 4A, each of the first and second slots 326, 328 form and/or define a path along which a pin can travel. In some examples, a first path (e.g., a non-linear path) 412 defined by the first slot 326 extends through the drive shoe 308 from the first end 408 of the first slot 326 to a second end 414 of the first slot 326 opposite to the first end 408. The first end 408 of the first slot 326 is sometimes referred to as an opposite end of the first slot 326, with respect to the second end 414 of the first slot 326. In such examples, the first pin 320 can travel along the first path 412 from the first end 408 of the first slot 326 to the second end 414 of the first slot 326. Further, in some examples, a second path (e.g., a linear path) 416 defined by the second slot 328 extends through the drive shoe 308 from the first end 410 of the second slot 328 to a second end 418 of the second slot 328 opposite to the first end 410 (i.e., an opposite end of the second slot 328). In such examples, the second pin 324 can travel along the second path 416 from the first end 410 of the second slot 328 to the second end 418 of the second slot 328. As the drive shoe 308 of FIG. 4A moves relative to the link 310, the internal surface(s) of the drive shoe 308 slide against and/or apply certain forces or loads to the respective first and second pins 320, 324, thereby guiding movement of the first and second pins 320, 324 and/or substantially keeping the first and second pins 320, 324 on the respective first and second paths 412, 416.

The drive shoe 308 of FIG. 4A has a first dimension (e.g., a length) 420 and a second dimension (e.g., a height) 422 different from the first dimension 420. As shown in FIG. 4A, the first dimension 420 is substantially greater than the second dimension 422. Additionally, the drive shoe 308 includes a first end (e.g., a rear end) 424 and a second end (e.g., a front end) 426 opposite to the first end 424. The first end 424 of the drive shoe 308 is proximate to or adjacent the first end 408 of the first slot 326, while the second end 426 of the drive shoe 308 is proximate to or adjacent the second end 418 of the second slot 328. In particular, the first slot 326 of FIG. 4A non-linearly extends away from the first end 424 of the drive shoe 308 toward the second end 426 of the drive shoe 308 across the first dimension 420 and the second dimension 422. On the other hand, the second slot 328 linearly extends away from the second end 426 of the drive shoe 308 toward the first end 424 of the drive shoe 308 across only the first dimension 420.

As shown in FIG. 4A, the second path 416 provided by the second slot 328 is substantially linear, wherein the second path 416 extends only in a length direction of the drive shoe 308 but not in a height direction of the drive shoe 308. In contrast, the first path 412 provided by the first slot 326 is substantially non-linear, wherein the first path 412 extends in both the length direction and the height direction of the drive shoe 308. In some examples, the first slot 326 includes a first section 428, a second section 430 adjacent the first section 428, and a third section 432 adjacent the second section 430. That is, the second section 430 of the first slot 326 is between the first and third sections 428, 432 and/or connects the first section 428 to the third section 432. In such examples, each of the first and third sections 428, 432 of the first slot 326 is substantially horizontal and/or linearly extends only in the length direction of the drive shoe 308, which facilitates maintaining the relative orientation of the link 310.

In some examples, as the first pin 320 slides through the first or third section 428, 432 of the first slot 326, the drive shoe 308 imparts one or more loads on the first pin 320 that substantially prevent the relative orientation of the link 310 from changing. On the other hand, the second section 430 of the first slot 326 is substantially inclined and/or curved. In particular, unlike the first and third section 428, 432, the second section 430 extends partially in the height direction of the drive shoe 308, which facilitates changing the relative orientation of the link 310. In some examples, as the first pin 320 slides through the second section 430 of the first slot 326, the drive shoe 308 imparts one or more additional loads on the first pin 320 that urge the link 310 to rotate about the second axis 329. Thus, changes in relative orientation of the link 310 are substantially based on changes in a height position of the first pin 320 relative to the drive shoe 308. As such, the second section 430 can be particularly shaped and/or designed to provide one or more desired angular motion parameters of the link 310 during sunroof operation.

To facilitate changing the state of the drive mechanism 306 cooperatively with the first guide block 334 and/or maintaining the drive mechanism 306 in the second state, the first slot 326 and/or, more generally, the drive shoe 308 of FIG. 4A also includes an example locking area 434 to receive and temporarily hold the first pin 320 during sunroof operation (e.g., when the drive shoe 308 approaches and/or reaches the third or final drive shoe position). The locking area 434 is adjacent the third section 432 of the first slot 326 and/or connected to the third section 432, such that the first pin 320 can easily pass between the third section 432 and the locking area 434. In some examples, the locking area 434 is positioned substantially at the second end 414 of the first slot 326, which provides for an increased angular displacement of the link 310. The locking area 434 may also be positioned substantially at a central portion of the drive shoe 308 that is between the first and second ends 424, 426 of the drive shoe 308. In particular, the drive mechanism 306 transitions from the first state to the second state in response to the first pin 320 entering the locking area 434, as will be discussed further below. Additionally, while the first pin 320 is in the locking area 434, horizontal translation of the link 310 and the bracket 302 along the rail 304 is allowed. In some examples, the drive shoe 308 is configured to engage opposite sides of the first pin 320 while the first pin 320 is in the locking area 434, such that movement of the drive shoe 308 in the first or second direction 316, 318 causes the link 310 and the bracket 302 to move in the same direction together with the drive shoe 308.

As shown in FIG. 4A, a width of the first slot 326 is substantially uniform or constant across the first, second, and third sections 428, 430, 432, whereas the width of the first slot 326 increases or expands across the locking area 434. In some examples, the first slot 326 flares at the second end 414 thereof. Accordingly, the locking area 434 may be wider than each of the first, second, and third sections 428, 430, 432 of the first slot 326. Stated differently, in some examples, the locking area 434 has a first width that is greater than a second width of a section (e.g., the third section 432) of the first slot 326 adjacent the locking area 434.

Turning to FIG. 4B, a subsequent or second stage of the sunroof opening operation is shown. According to the illustrated example of FIG. 4B, the drive shoe 308 is in the second position relative to the link 310, where the first pin 320 is in the third section 432 of the first slot 326 to provide the second orientation of the link 310. In contrast to the illustrated example of FIG. 4A, the drive shoe 308 moved in the first direction 316 relative to the link 310 through the guide channel 402, and the first pin 320 passed through the second section 430 of the first slot 326 from the first section 428 to the third section 432. In particular, the intermediate state of the sunroof 102 is provided and substantially maintained while the first pin 320 remains in the third section 432 of the first slot 326.

Turning to FIG. 4C, a subsequent or third stage of the sunroof opening operation is shown. According to the illustrated example of FIG. 4C, the drive shoe 308 is in the third position thereof relative to the link 310, where the first pin 320 is positioned at the second end 414 of the first slot 326 and the second pin 324 is positioned at the second end 418 of the second slot 328. In contrast to the illustrated example of FIG. 4B, the drive shoe 308 moved further in the first direction 316 relative to the link 310 through the guide channel 402, and the first pin 320 entered the locking area 434. In some examples, a highest rotation angle of the link 310 is achieved when the drive shoe 308 reaches the third drive shoe position due to the positioning of the locking area 434, and the link 310 may have a relatively large angular displacement as a result. In such examples, the first pin 320, the second pin 324, the first slot 326, and the second slot 328, together, are structured such that movement of the drive shoe 308 relative to the link 310 from the first drive shoe position to the third drive shoe position rotates the link 310 about the second axis 329 in a single rotational direction (e.g., the first rotational direction 374) from the first orientation to the target orientation. In FIG. 4C, the link 310 is substantially tilted and/or angled relative to the drive shoe 308. Further, the angle 378 previously described may be defined by a horizontal axis and a fourth axis 437 that is aligned to and/or extending through the first and second pins 320, 324 of the link 310.

According to the illustrated example of FIG. 4C, when the first pin 320 enters the locking area 434, the drive shoe 308 is configured to impart one or more loads on the first pin 320 that urge the link 310 into the target orientation and enable the link 310 and the bracket 302 to slide along the rail 304 together with the drive shoe 308 in the length direction of the vehicle 100. In some examples, the drive shoe 308 applies a first or primary load 436 to the first pin 320 having a vertical force component. Further, in some examples, the drive shoe 308 applies a second load 438 and/or a third load 440 to the first pin 320, each of which has a horizontal force component. As shown in FIG. 4C, the drive shoe 308 is engaged with a rear portion 442 of the first pin 320 and a front portion 444 of the first pin 320 opposite to the rear portion 442, which allows the drive shoe 308 to effectively drag or pull the link 310 and, consequently, the bracket 302 and the panel held by the bracket 302. As such, in some examples, the drive shoe 308 is configured to directly contact the rear portion 442 and the front portion 444 of the first pin 320 when the first pin 320 is in the locking area 434. Such engagement of the drive shoe 308 and the first pin 320, as depicted in FIG. 4C, can maintain the target orientation as well as a position of the link 310 relative to the drive shoe 308 during a final stage of the sunroof opening operation.

In some examples, while the link 310 of FIG. 4C is held or locked in the target orientation, the drive shoe 308 is configured to impart the second load 438 on the front portion 444 of the first pin 320, thereby urging the link 310 and the bracket 302 to move along the rail 304 in the first direction 316 together with the drive shoe 308. In this manner, the third and fourth pins 340, 344 on the link 310 can disconnect and/or separate from the first guide block 334 and pass into the rail 304 via the fifth and sixth slots 364, 366. Conversely, in some examples while the link 310 of FIG. 4C is held or locked in the target orientation, the drive shoe 308 is configured to impart the third load 440 on the rear portion 442 of the first pin 320 during the sunroof closing operation, thereby urging the link 310 and the bracket 302 to move along the rail 304 in the second direction 318 together with the drive shoe 308. In this manner, the third and fourth pins 340, 344 and/or, more generally, the link 310 can reconnect to and/or slidably engage the first guide block 334. In response to the link 310 reconnecting with the first guide block 334, the first pin 320 of FIG. 4C may exit the locking area 434 and enter the third section 432 of the first slot 326 resulting from the first guide block 334 applying reaction load(s) to the third pin 340 and/or the fourth pin 344. As shown in FIG. 4C, the first pin 320 is positioned at an uppermost (in the orientation of FIG. 4C) portion of the drive shoe 308 between the first and second ends 424, 426 thereof, while the second pin 324 is positioned at a lowermost (in the orientation of FIG. 4C) portion of the drive shoe 308 adjacent the second end 426 thereof.

Figure 5A:
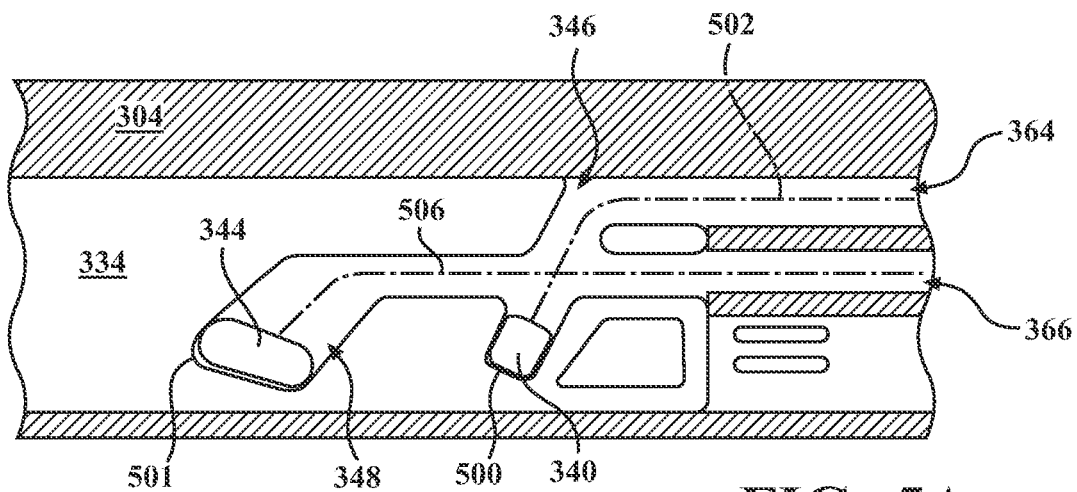
FIGS. 5A, 5B, and 5C are detailed views of an example guide block and show different stages of the sunroof opening operation.
Figure 5B:
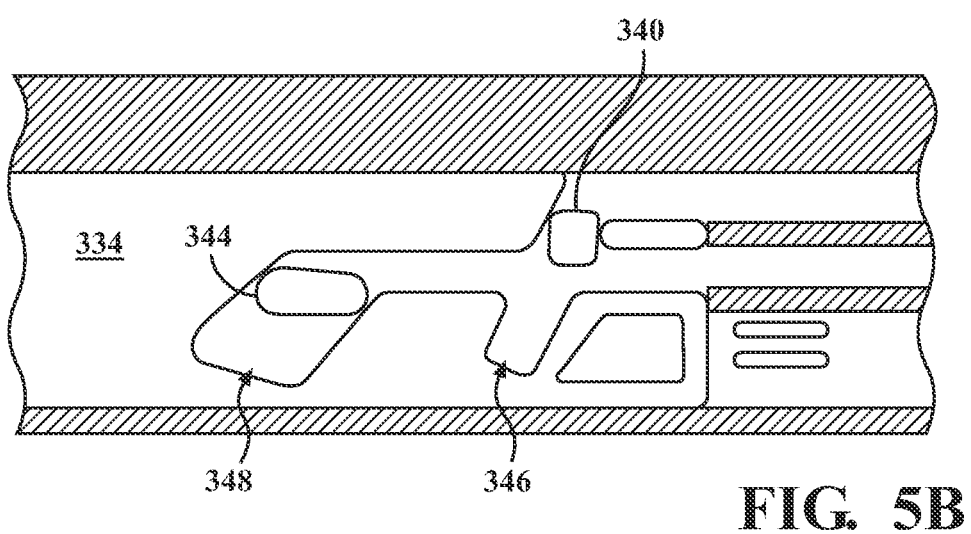
Figure 5C:
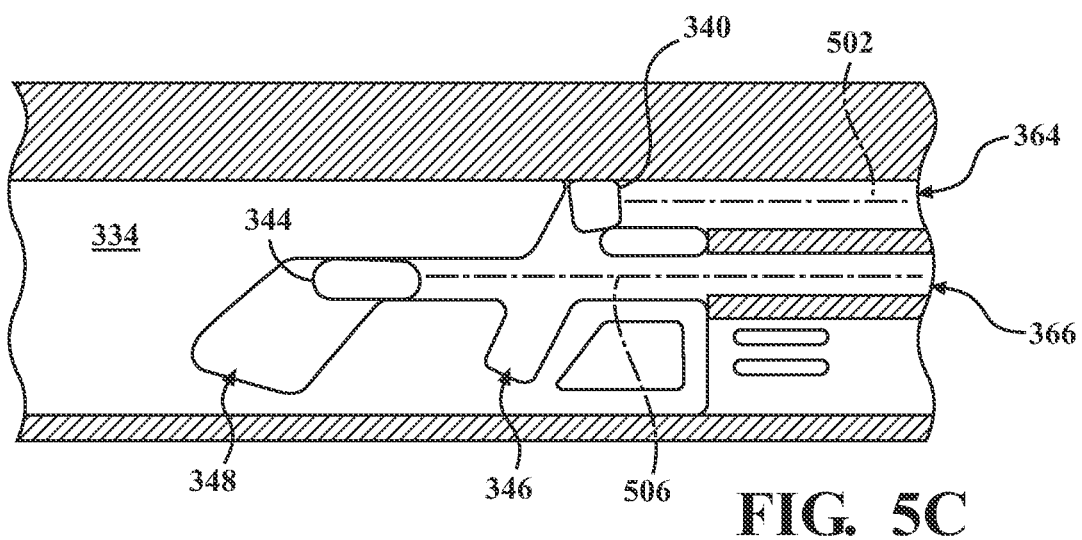

FIGS. 5A, 5B, and 5C are detailed views of the first guide block 334 and show the different stages of the sunroof opening operation with respect to the first guide block 334 and third and fourth pins 340, 344 on the link 310. According to the illustrated examples of FIGS. 5A, 5B, and 5C, the drive shoe 308 is urging the link 310 to rotate about the second axis 329 in the first rotational direction 374 from the first orientation to the target orientation, such that the third and fourth pins 340, 344 slide through the respective third and fourth slots 346, 348 in the first guide block 334. In FIGS. 5A, 5B, and 5C, the third slot 346 and the fourth slot 348 are sized and/or shaped in connection with supporting the link 310 via the third and fourth pins 340, 344 during the first stage, the second stage, and at least part of the third stage of the sunroof opening operation.

Turning to FIG. 5A, the first stage of the sunroof opening operation is shown. According to the illustrated example of FIG. 5A, the link 310 is in the first orientation relative to the drive shoe 308 and the first guide block 334, where the third pin 340 is positioned at an end 500 of the third slot 346 and the fourth pin 344 is positioned at an end 501 of the fourth slot 348. The third slot 346 of FIG. 5A defines a third path (e.g., a non-linear path) 502 extending through the first guide block 334 along which the third pin 340 can travel during sunroof operation. As the third pin 340 of FIG. 5A moves through the third slot 346 across the third path 502 and away from the end 500 of the third slot 346, the internal surface(s) of the first guide block 334 slide against the third pin 340 to provide support to the link 310. In such examples, the third path 502 extends from the end 500 of the third slot 346 to the fifth slot 364 in the rail 304, where the third pin 340 can travel along the third path 502 from the end 500 of the third slot 346 to the fifth slot 364. As such, the third path 502 can be at least partially formed and/or defined by the fifth slot 364.

Further, the fourth slot 348 of FIG. 5A forms and/or defines a fourth path (e.g., a non-linear path) 506, different from the third path 502, extending through the first guide block 334 along which the fourth pin 344 can travel during sunroof operation. In some examples, as the fourth pin 344 moves through the fourth slot 348 across the fourth path 506 and away from the end 501 of the fourth slot 348, the internal surface(s) of the first guide block 334 slide against the fourth pin 344 to provide additional support to the link 310. In such examples, the fourth path 506 extends from the end 501 of the fourth slot 348 to the sixth slot 366 in the rail 304, where the fourth pin 344 can travel along the fourth path 506 from the end 501 of the fourth slot 348 to the sixth slot 366. As such, the fourth path 506 can be at least partially formed and/or defined by the sixth slot 366.

Turning to FIG. 5B, the second stage of the sunroof opening operation is shown. As such, the link 310 is in the second orientation relative to the drive shoe 308 and the first guide block 334, and the sunroof 102 is in the intermediate state. In contrast to the illustrated example of FIG. 5A, the link 310 rotated about the second axis 329 in the first rotational direction 374, and the third and fourth pins 340, 344 travelled partially across the respective third and fourth paths 502, 506. According to the illustrated example of FIG. 5B, each of the third and fourth pins 340, 344 is supported by the internal surface(s) of the first guide block 334. Thus, during the first and second stages of the sunroof opening operation, the link 310 remains substantially engaged with the first guide block 334 via the third and fourth pins 340, 344. Moreover, engagement of the first guide block 334 and the third and fourth pins 340, 344 during the first and second stages prevents the link 310 from separating from the first guide block 334, until the link 310 reaches the target orientation.

Turning to FIG. 5C, the third stage of the sunroof opening operation is shown. As such, the link 310 is in the target orientation relative to the drive shoe 308 and the first guide block 334, and the third and fourth pins 340, 344 are positioned at topmost portions of the respective third and fourth slots 346, 348. In contrast to the illustrated example of FIG. 5B, the link 310 further rotated about the second axis 329 in the first rotational direction 374 as a result of the first pin 320 entering the locking area 434 and receiving the primary load 436 from the drive shoe 308. In some examples, the third pin 340, the fourth pin 344, the third slot 346, and the fourth slot 348, together, are structured such that each of the third and fourth pins 340, 344 remains in direct contact with the first guide block 334 at all orientations of the link 310 to reduce operational noise. That is, engagement of the third pin 340 and the first guide block 334 is substantially maintained until the third pin 340 enters the rail 304, and engagement of the fourth pin 344 and the first guide block 334 is substantially maintained until the fourth pin 344 enters the rail 304. As a result, the third and fourth pins 340, 344 are prevented from slipping out of the first guide block 334 under high loading conditions, and related noise is substantially reduced and/or eliminated.

According to the illustrated example of FIG. 5C, the link 310 is separable from the first guide block 334 due to the link 310 being in the target orientation. In particular, the third and fourth pins 340, 344 of FIG. 5C can slide horizontally through the first guide block 334 in the first direction 316 across linear sections of the respective third and fourth paths 502, 506, thereby exiting the first guide block 334 and entering the rail 304 in a controller manner, where the rail 304 slidably supports the third and fourth pins 340, 344. While the third and fourth pins 340, 344 are positioned in the respective fifth and sixth slots 364, 366, the rail 304 is configured to impart certain loads (e.g., vertical loads) on the respective third and fourth pins 340, 344 that substantially keep the link 310 in the target orientation, while allowing the link 310 to slide horizontally along the rail 304 together with the drive shoe 308.

Figure 6:
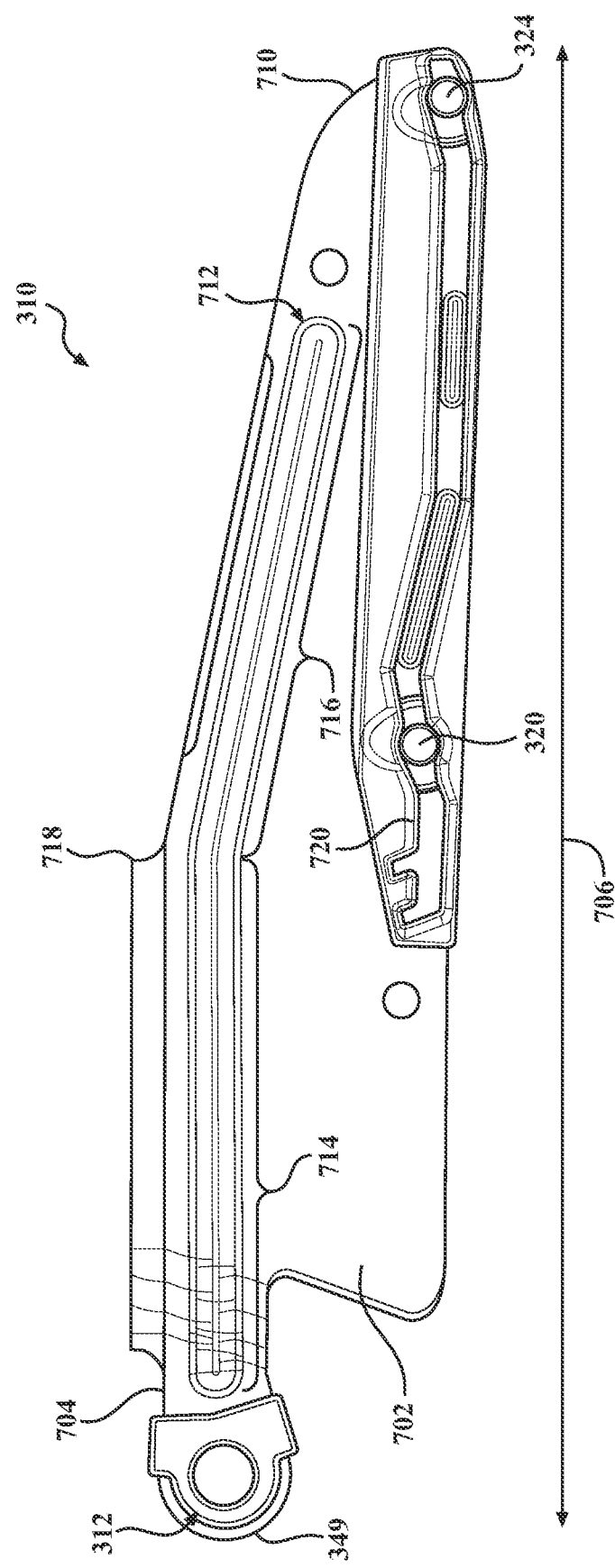
FIG. 6 is a detailed view of an example link in accordance with the teachings of this disclosure.

FIG. 6 is a detailed view of the link 310 and shows an implementation thereof. According to the illustrated example of FIG. 6, the link 310 includes an example link body 702 and an example arm (e.g., a lever arm) 704 on the link body 702 that projects from the link body 702. The arm 704 is configured to receive and rotatably connect to the bracket 302 via an opening 302p (FIG. 9) formed in the bracket first end 350 to create the first movable joint 312. The arm 704 can be fixedly coupled to the body 702, for example, via one or more example fasteners and/or one or more fastening methods or techniques. Further, one or more (e.g., all) of the first pin 320, the second pin 324, the third pin 340, and/or the fourth pin 344 can be similarly coupled to the link body 702. Accordingly, forces resulting from sunroof operation can be transmitted through the arm 704 and the link body 702 between the first movable joint 312 and one or more (e.g., all) of the pin(s) 320, 324, 340, 344 on the link 310. In some examples, a length 706 of the arm 704 is relatively short to allow for a substantial reduction in such forces. The length 706 of FIG. 6 is defined by the first end 349 of the link 310 corresponding to a portion of the arm 704 and a second end 710 of the link 310 corresponding to a portion of the link body 702 opposite to the first end 349.

In some examples, the link 310 is provided with at least one elongated bead 712 coupled thereto. In FIG. 6, the elongated bead 712 extends along the link 310 in a length direction of the link 310 between the first and second ends 349, 710 of the link 310. In particular, the elongated bead 712 of FIG. 6 is configured to increase a cross-sectional stiffness of the link 310. In such examples, the elongated bead 712 can be positioned on at least a portion of the arm 704 adjacent the first movable joint 312. Additionally or alternatively, the elongated bead 712 can be positioned on at least a portion of the link body 702. In FIG. 6, the elongated bead 712 is defined by both the link body 702 and the arm 704. Further, the elongated bead 712 of FIG. 6 extends alongside or adjacent a topmost (in the orientation of FIG. 6) portion of the link 310 away from the first movable joint 312 toward the second pin 324.

As shown in FIG. 6, the elongated bead 712 extends across at least half of the length 706 of the link 310. In some examples, the elongated bead 712 may include a first segment (e.g., a linear segment) 714 and a second segment (e.g., a linear segment) 716 adjacent the first segment 714. The first segment 714 is arranged along a part of the link 310 and linearly extends in a first direction, while the second segment 716 is arranged along a different part of the link 310 and linearly extends in a second direction different from the first direction. As shown in FIG. 6, the first segment 714 can be substantially angled relative to the second linear segment 716. That is, an axis of the first segment 714 and an axis of the second segment 716 may define a relatively small angle.

Additionally, in some examples, the link 310 is provided with an example flange 718 coupled thereto adjacent the elongated bead 712. In FIG. 6, the flange 718 extends along the link 310 in the length direction of the link 310 between the first and second ends 349, 710 of the link 310. In particular, the flange 718 of FIG. 6 is configured to increase strength and/or rigidity of the link 310. In such examples, the flange 718 can be positioned on at least a portion of the arm 704 adjacent the first movable joint 312. Additionally or alternatively, the flange 718 can be positioned on at least a portion of the link body 702. In FIG. 6, the flange 718 is defined by both the link body 702 and the arm 704. Further, the flange 718 of FIG. 6 extends along the topmost portion of the link 310 away from the first movable joint 312 toward the second pin 324.

Additionally, in some examples, the link 310 is provided with an overmolded portion 720 coupled thereto. In FIG. 6, the overmolded portion 720 is arranged on outer surface of the link body 702 and covering the first, second, third, and fourth pins 320, 324, 340, 344. The overmolded portion 720 of FIG. 6 is positioned at a bottommost (in the orientation of FIG. 6) portion of the link body 702. In particular, the overmolded portion 720 provides support to the pins 320, 324, 340, 344 as well as stabilizes the link 310 during sunroof operation. In such examples, relatively large surface areas of the overmolded portion 720 are configured to slide against the rail 304 and/or the drive shoe 308 to prevent the link 310 from twisting, as discussed further below in connection with FIG. 8.

Figure 7A:
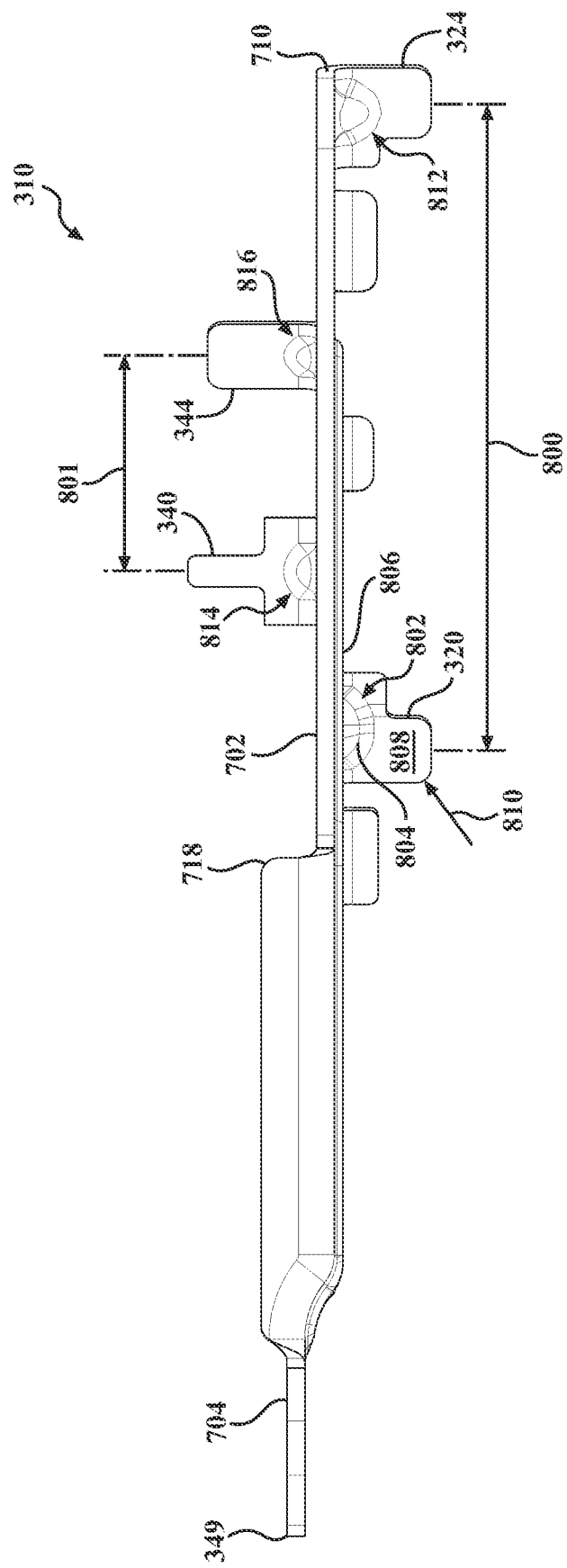

FIGS. 7A, 7B, 7C, 7D, and 7E are other detailed view of the link 310 and show additional implementations thereof. According to the illustrated examples of FIGS. 7A, 7B, 7C, 7D, and 7E, the overmolded portion 720 has been removed from the link body 702, for clarity. Turning to FIG. 7A, a top-view of the link 310 is shown. In FIG. 7A, each of the first pin 320, the second pin 324, the third pin 340, and the fourth pin 344 is fixedly coupled to the link body 702, for example, via one or more fasteners and/or one or more fastening methods or techniques. In some examples, the third and fourth pins 340, 344 are between the first and second pins 320, 324. That is, each of the third and fourth pins 340, 344 can be positioned on an area of the link 310 located substantially between different areas of link 310 on which the respective first and second pins 320, 324 are positioned. In such examples, the first and second pins 320, 324 are positioned farther apart relative to each other compared to the third and fourth pins 340, 344. As shown in FIG. 7A, the second pin 324 is spaced from the first pin 320 by a first distance 800, while the fourth pin 344 is spaced from the third pin 340 by a second distance less 801 than the third distance. Additionally, the first pin 320 of FIG. 7A is positioned at an intermediate portion of the link 310 that is between the first and second ends 349, 710 of the link 310, while the second pin 324 of FIG. 7A is positioned substantially at or adjacent the second end 710 of the link 310.

In some examples, the link 310 includes at least one bead defined by the link body 702 and the first, second, third, or fourth pin 320, 324, 340, 344 configured to reduce stress and/or concentration(s) thereof in the link 310 resulting from a load applied to the link 310. For example, the link 310 of FIG. 7A can be provided with a first example bead 802 coupled thereto. The first bead 802 of FIG. 7A is interposed between the link body 702 and the first pin 320, which increases strength and/or rigidity of the first pin 320. In FIG. 7A, the link body 702 and the first pin 320, together, form and/or define the first bead 802. In some examples, the first bead 802 includes an outer surface (e.g., a substantially continuous surface) 804 having one or more preformed curvatures and/or bends therein. Further, the first bead 802 extends from an outer surface 806 of the link body 702 to an outer surface 808 of the first pin 320 and/or connects the outer surfaces 806, 808 together. In particular, stress resulting from an example load 810 applied to the first pin 320 (by the drive shoe 308) is effectively distributed through the first bead 802, thereby preventing mechanical failure of the link 310 during high loading conditions.

Additionally, in some examples, the link 310 can be provided with multiple beads, each of which corresponds to a respective one of the pins 320, 324, 340, 344. As shown in FIG. 7A, a second bead 812 of the link 310 can be defined by the link body 702 and the second pin 324, a third bead 814 of the link 310 can be defined by the link body 702 and the third pin 340, and a fourth bead 816 of the link 310 can be defined by the link body 702 and the fourth pin 344. In such examples, aspects depicted in connection with the first bead 802 can likewise apply to one or more (e.g., all) of the second bead 812, the third bead 814, the fourth bead 816, and/or any other bead(s) of the link 310.

In some examples, the link 310 of FIG. 7A is a one-piece component. In such examples, at least some or all of the first pin 320, the second pin 324, the third pin 340, the fourth pin 344, the link body 702, the arm 704, the elongated bead 712, the flange 718, the first bead 802, the second bead 812, the third bead 814, and/or the fourth bead 816 are integrally formed, for example, via one or more manufacturing processes, methods, and/or techniques. In any case, any of the first pin 320, the second pin 324, the third pin 340, the fourth pin 344, the link body 702, the arm 704, the elongated bead 712, the flange 718, the overmolded portion 720, the first bead 802, the second bead 812, the third bead 814, the fourth bead 816, and/or, more generally, the link 310 of FIG. 7A can be constructed of one or more materials having desired material properties (e.g., any of strength, rigidity, corrosion resistance, etc.) such as, for example, any of metal, plastic, and the like, or a combination thereof.

Figure 7B:
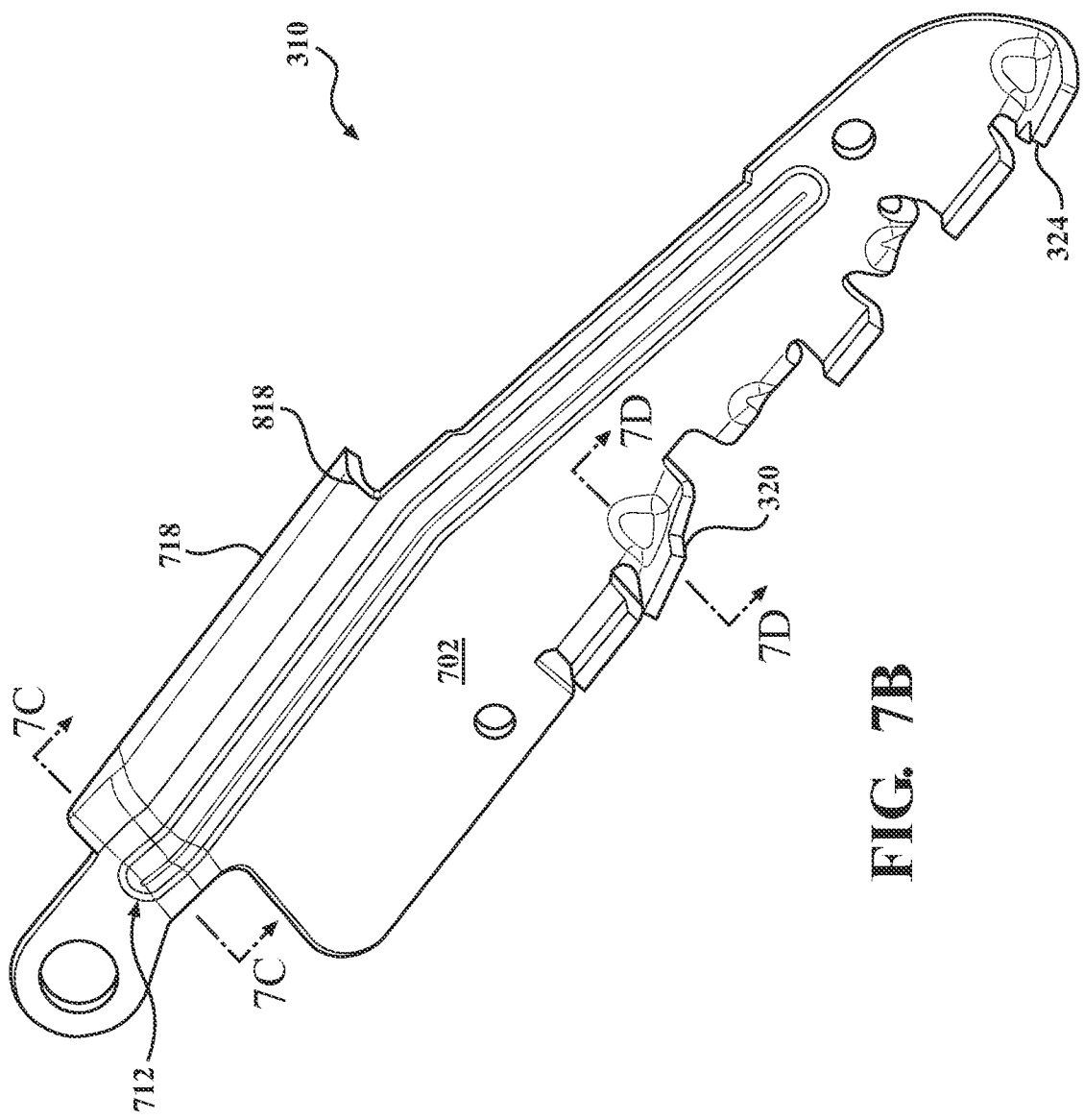

Turning to the FIG. 7B, an isometric view of the link 310 is shown, where the first and second pins 320, 324 on the link body 702 are visible. As shown in FIG. 7B, the flange 718 curves away from the elongated bead 712 and the topmost portion of the link 310. In some examples, the flange 718 is provided with a preformed bend 818 having a certain radius of curvature. In such examples, the radius of curvature can be substantially uniform across the length of the flange 718 or at least part thereof.

Turning to FIG. 7C, a cross-sectional view of the link 310 along line C-C of FIG. 7B is shown. In particular, a first example cross-sectional area 820 of the link 310 is depicted in the illustrated example of FIG. 7C, where the elongated bead 712 and the flange 718 form and/or define the first cross-sectional area 820 or at least a portion thereof. In some examples, the elongated bead 712 includes a protrusion 822 on the first side 322 of the link 310 and a recess 824 on the second side 342 of the link 310. In such examples, the protrusion 822 protrudes away from the first side 322 of the link 310, while the recess 824 extends at least partially into the second side 342 of the link 310.

Turning to FIG. 7D, a cross-sectional view of the link 310 along line D-D of FIG. 7B is shown. In particular, a second example cross-sectional area 826 of the link 310 is depicted in the illustrated example of FIG. 7D, where the first pin 320, the first bead 802, and the link body 702 form and/or define the second cross-sectional area 826 or at least a portion thereof. In FIG. 7D, the first bead 802 is connected between the first pin 320 and the link body 702. In some examples, the first bead 802 is provided with a first preformed bend 828 having a relatively large or certain radius of curvature to facilitate reducing associated stress concentration(s) resulting from the applied load 810. Similarly, the first bead 802 can also be provided with a second preformed bend 830, different from the first preformed bend 828, having a relatively large or certain radius of curvature to further facilitate reducing the associated stress concentration(s). The first preformed bend 828 of FIG. 7C may serve as an interface of the first bead 802 and the first pin 320, while the second preformed bend 830 may serve as an interface of the first bead 802 and the link body 702.

Figure 7E:
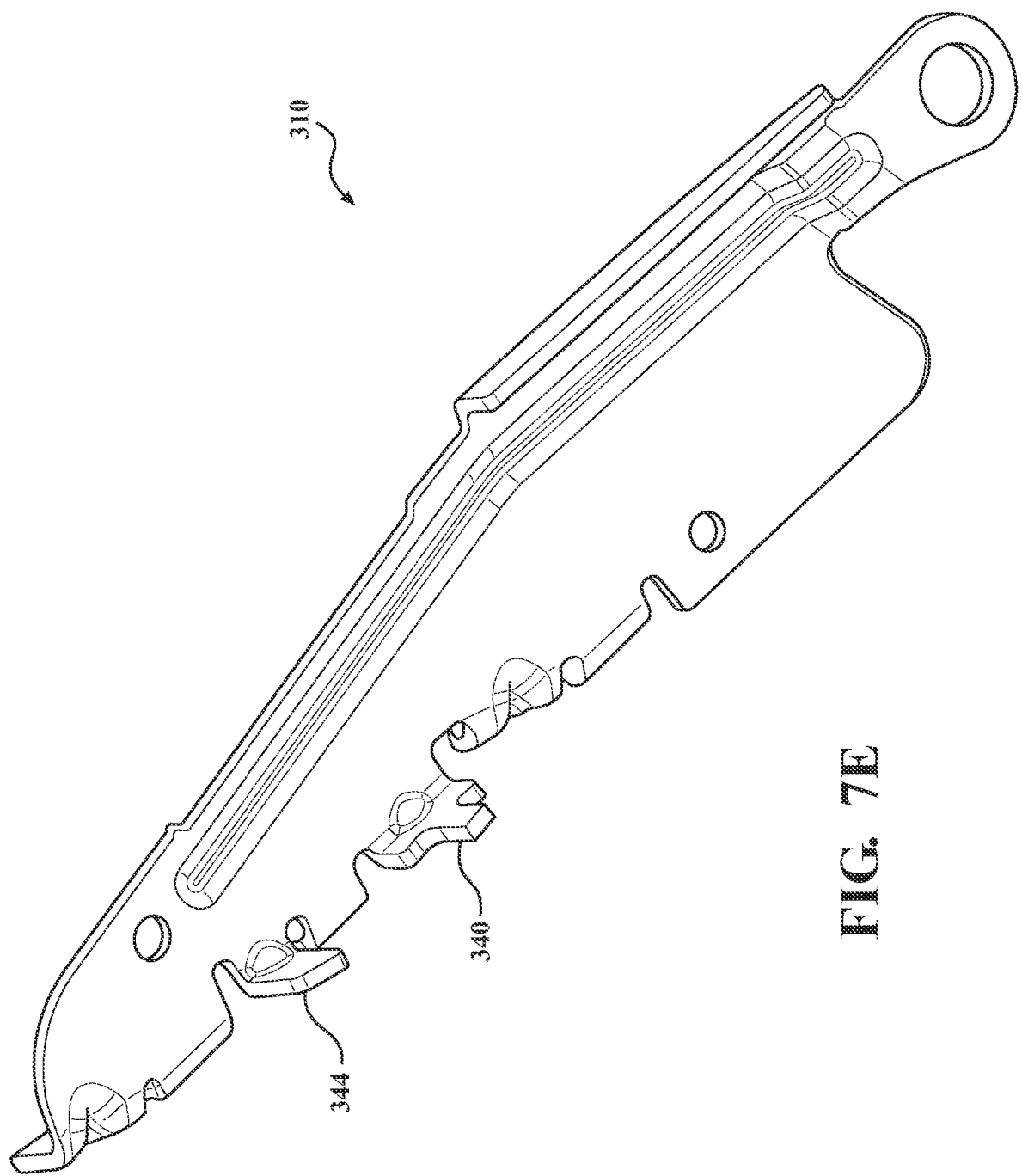

Turning to FIG. 7E, an additional isometric view of the link 310 is shown, where the second and third pins 340, 344 on the link 310 are visible.

FIG. 8 is a top-view or plan view of the sunroof assembly 300 and shows the drive mechanism 306 in the rail 304. In FIG. 8, each of the drive shoe 308 and the link 310 are slidably disposed in the primary guide channel 402 of the rail 304. The drive shoe 308, which is substantially represented by the dotted/dashed lines of FIG. 8, is covered by a part of the rail 304. Additionally, the first and second pins 320, 324 are engaged with the drive shoe 308, while the third and fourth pins 340, 344 are engaged with the rail 304. Accordingly, the link 310 of FIG. 8 is separated or spaced from the first guide block 334 (not shown) and maintained in the target orientation due to such engagement of the pins.

According to the illustrated example of FIG. 8, the first pin 320 corresponds to a first touch point 902 for the link 310, and the second pin 324 corresponds to a second touch point 904 for the link 310 different from the first touch point 902. The first touch point 902 and the second touch point 904 can be spaced from each other by a third distance 906. In some examples, the overmolded portion 720 defines the first touch point 902 and the second touch point 904. In such examples, each of the first and second touch points 902 and 904 is configured to abut, for example, the drive shoe 308, thereby providing support to the first and second pins 320, 324 and/or stabilizing the link 310. Additionally, in some examples, an area of the link 310 behind the third and fourth pins 340, 344 is supported by at least one component of the assembly 300, which prevents the link 310 from twisting during high loading conditions and/or reduces related noise during vibration. In such examples, the overmolded portion 720 defines a support surface (e.g., a relatively long, flat surface) 908 of the link 310 facing away from the drive shoe 308. The support surface 908 may be substantially smooth and/or continuous. As shown in FIG. 8, the support surface 908 extends along the overmolded portion 720 from the third pin 340 to the fourth pin 344. Further, the support surface 908 extends past or beyond both the third and fourth pins 340, 344. The support surface 908 of FIG. 8 may extend in the length direction of the link 310 across a fourth distance 910 substantially equal to or greater than the third distance 906. In such examples, the support surface 908 is configured to abut, for example, a side portion 912 of the rail 304 defining at least a part of the primary guide channel 402,
thereby providing support to the third and fourth pins 340, 344 and/or further stabilizing the link 310.

In FIG. 8, the overmolded portion 720 is positioned and/or held between the side portion 912 of the rail 304 and the drive shoe 308, where the touch points 902 and 904 and support surface 908 are substantially engaged with the respective drive shoe 308 and side portion 912. As a result, a substantially even force distribution is provided for the link 310 in its interaction with the rail 304 and the drive shoe 308, which reduces and/or eliminates binding and/or increases system efficiency. In some examples the touch points 902 and 904 are configured to abut the drive shoe 308 at all states of the sunroof 102 to provide the support to the first and second pins 320, 324 and prevent the twisting of the link 310 previously described, and the support surface 908 is configured to abut the rail 304 (or the first guide block 334) at all states of the sunroof 102 to provide the support to the third and fourth pins 340, 344 and further prevent the twisting of the link 310. As a result of such an engagement scheme associated with the touch points 902 and 904, the drive shoe 308, the support surface 908, and the rail 304, a certain amount of a cross-car rotation associated with the drive mechanism 306 is reduced and/or eliminated during sunroof operation without impeding the functionality of the drive mechanism 306.

FIG. 15 is a schematic cross-sectional view of the sunroof assembly 300 along line 15-15 of FIG. 12 and shows positioning associated with the drive mechanism 306 and the rail 304. In some examples, the rail 304 may be a longitudinal extrusion formed to have various walls and projections defining the rail cavity 304c and rail cavity opening 304d. The rail cavity 304c may linearly extend through the rail body 1002 along an axis. In some examples, the rail cavity 304c is arranged along a length of the rail 304 or at least part of the length. FIG. 15 shows the first sunroof panel 204 in the fully open position.

In one or more arrangements, the rail 304 may include a primary guide channel 402 and one or more additional guide channels formed therein. In particular arrangements, the primary guide channel 402 of FIG. 15 may be sized and/or shaped to receive portions of the drive mechanism 306 (such as drive shoe 308) and guide movement of the drive mechanism elements through the guide channels during sunroof operation.

To better guide movable components of the sunroof assembly 300, the rail cavity 304c may include additional guide channels as well as primary guide channel 402. Each of the additional channels may extend at least partially across the length of the rail 304 to receive and guide a movable sunroof component. For example, as seen in FIG. 15, a wall 304z extending opposite and laterally spaced apart from the first sunroof panel longitudinal edge 204c and the second sunroof panel longitudinal edge 206c may define a portion of the rail cavity opening 304d leading into rail cavity 304c. The opening 304d may form a guide channel 304w structured to guide the link 310 and bracket 302 for movement along the rail 304 during opening and closing of the first sunroof panel 204 as described herein. In particular, guide channel 304w may be structured to accommodate rotational and longitudinal movement of the bracket 302 along the guide channel 304w in conjunction with corresponding rotational and longitudinal movement of the link 310 along the channel 304w, as described herein.

As seen in FIGS. 10-12 and 15, a portion of the link 310 may extend into the rail cavity 304c through the rail cavity opening 304d. Inside the rail cavity 304c, the link 310 may be operably connected to the drive shoe 308 as previously described. Also, a portion of the bracket 302 (such as support portion 359) may extend from the first sunroof panel 204 into the rail cavity 304c through the rail cavity opening/guide channel 304d.

As previously described with regard to FIGS. 3C and 3F, slots 368, 370, 369, 377 guiding movement of the opposed bracket pins 356 and 357 may be provided in separate second and third guide blocks 358 and 363 coupled to an end of the rail 304. A pin guide channel 304p may be structured in the rail 304 to receive bracket pin 356 from guide slot 370 (FIG. 3C) and guide the bracket pin 356 along the rail 304. Yet another pin guide channel 304r may be structured to receive bracket pin 357 from guide slot 377 (FIG. 3F) and guide the bracket pin 357 along the rail 304. The slot 370 may be structured to align and communicate with the rail guide channel 304p so that bracket pin 356 will move smoothly from slot 370 into guide channel 304p during motion of the bracket in the opening direction 316 of the first sunroof panel 204. Similarly, the slot 377 may be structured to align and communicate with the rail guide channel 304r so that bracket pin 357 will move smoothly from slot 370 into guide channel 304r during motion of the bracket in the opening direction 316 of the first sunroof panel 204. Thus, inside the rail cavity 304c, the bracket may be rotatably and slidably supported for motion along the rail 304 by engagement between the bracket pins 356, 357 and associated guide channels 304p, 304r formed in the rail 304, as previously described.

In FIG. 15, the drive shoe 308 may be positioned in the primary guide channel 402 (i.e., in the rail 304) and can travel along a path provided by the primary guide channel 402. In some examples, when the drive shoe 308 of FIG. 15 slides through the primary guide channel 402, one or more inner surfaces of the rail body slidably engage the drive shoe 308 to substantially maintain an orientation of the drive shoe 308 relative to the rail 304. In particular, the primary guide channel 402 can be configured to maintain the orientation of the drive shoe 308 at all of positions of the drive shoe 308.

Movement of the link 310 and the attached bracket 302 along the rail cavity opening/guide channel 304d will now be described with reference to the drawings, and with particular reference to FIGS. 10-12 and 15.

In one or more arrangements, for the portion of the bracket 302 extending between the first sunroof panel 204 and the rail cavity opening 304d, the second sunroof panel 206 may be structured so as not to overlie a portion of the rail cavity opening 304d along which the portion of the bracket 302 moves during motion of the first sunroof panel 204 from the closed position to the fully open position. This may enable movement of the bracket 302 along a substantial portion of the second sunroof panel longitudinal edge 206c, thereby maximizing the available travel of the bracket 302 and the size of the sunroof opening 214 (FIG. 2B).

FIG. 10 shows the first sunroof panel 204 in its closed position (as also shown in FIG. 2A). In the perspective view of FIG. 11, the first sunroof panel has been raised to a level above the second sunroof panel as previously described with respect to FIGS. 4A-4C and 5A-5C, so that the first sunroof panel 204 may be moved in direction 316 toward the fully open position. FIG. 11 shows the first sunroof panel 204 in the process of moving in direction 316 (FIG. 3E). During this movement, the portion of the link 310 extending into the rail cavity opening 304d may move alongside the second sunroof panel longitudinal edge 206c, which resides adjacent the rail cavity opening 304d.

Referring to FIGS. 10 and 11, in one or more arrangements, the assembly 300 may be structured so that the portion of the bracket 302 extending between the first sunroof panel 204 and the rail cavity opening 304d is movable along the rail cavity opening from a first side S1 of a plane P3 extending through the second sunroof panel lateral edge 206a and perpendicular to the opening direction 316 of the first panel 204, to a second side S2 of the plane P3 opposite the first side S1 of the plane, during movement of the first sunroof panel from the closed position to the fully open position. FIG. 11 shows the portion of the bracket 302 extending between the first sunroof panel 204 and the rail cavity opening 304d in a position along the first side S1 of the plane P3 and approaching the second sunroof panel 206, during movement of the first sunroof panel 204 in direction 316. FIG. 12 shows the portion of the bracket 302 extending between the first sunroof panel 204 and the rail cavity opening 304d in a position along the second side S2 of the plane P3, when the first sunroof panel 204 is in the fully open position. This arrangement may maximize a stroke or length of movement of the bracket 302 along the rail 304, which enables the bracket and the attached first sunroof panel 204 to be moved farther in direction 316.

Figure 13:
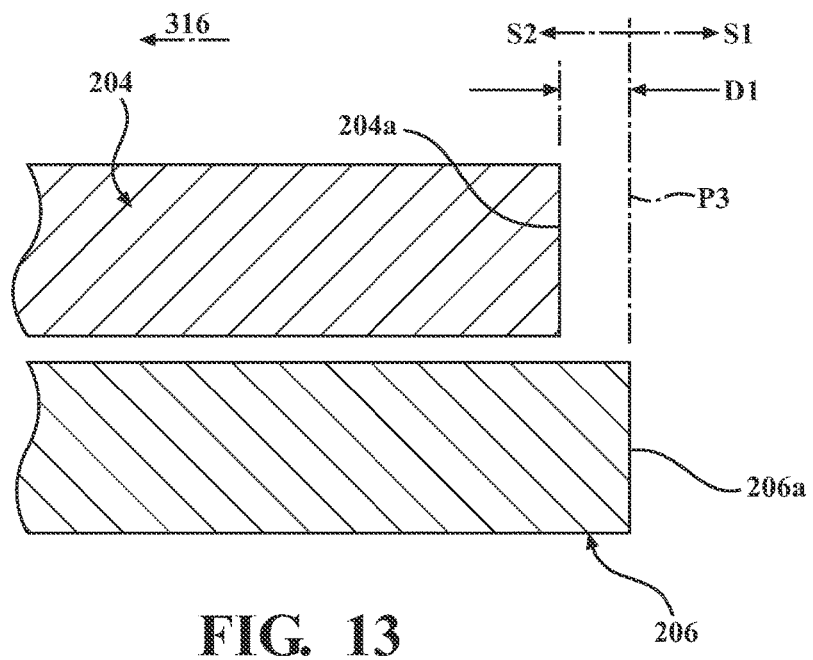
FIG. 13 is a schematic side view of a forward-most lateral edge of the second sunroof panel, illustrating a particular embodiment where the first lateral edge of the first sunroof panel resides behind (or rearwardly of) the forward-most lateral edge of the second sunroof panel when the first sunroof panel is in the fully open position.

In particular arrangements, and referring to FIG. 13, the assembly 300 may also be structured so that the first sunroof panel first lateral edge 204a is positioned on the second side S2 of the plane P3 extending through the second sunroof panel lateral edge 206a and perpendicular to the opening direction 316 of the first sunroof panel 204, when the first sunroof panel 204 is in the fully open position. FIG. 13 shows the first lateral edge 204a of the first sunroof panel 204 positioned along the second side S2 of the plane P3 and spaced apart a distance D1 from the plane P3. In this arrangement, the size of the sunroof opening 214 (FIG. 2B) when the first panel 204 is in the fully open position may be partially determined by the location of the second sunroof panel lateral edge 206a, rather than by the location of the first sunroof panel first lateral edge 204a.

Figure 14:
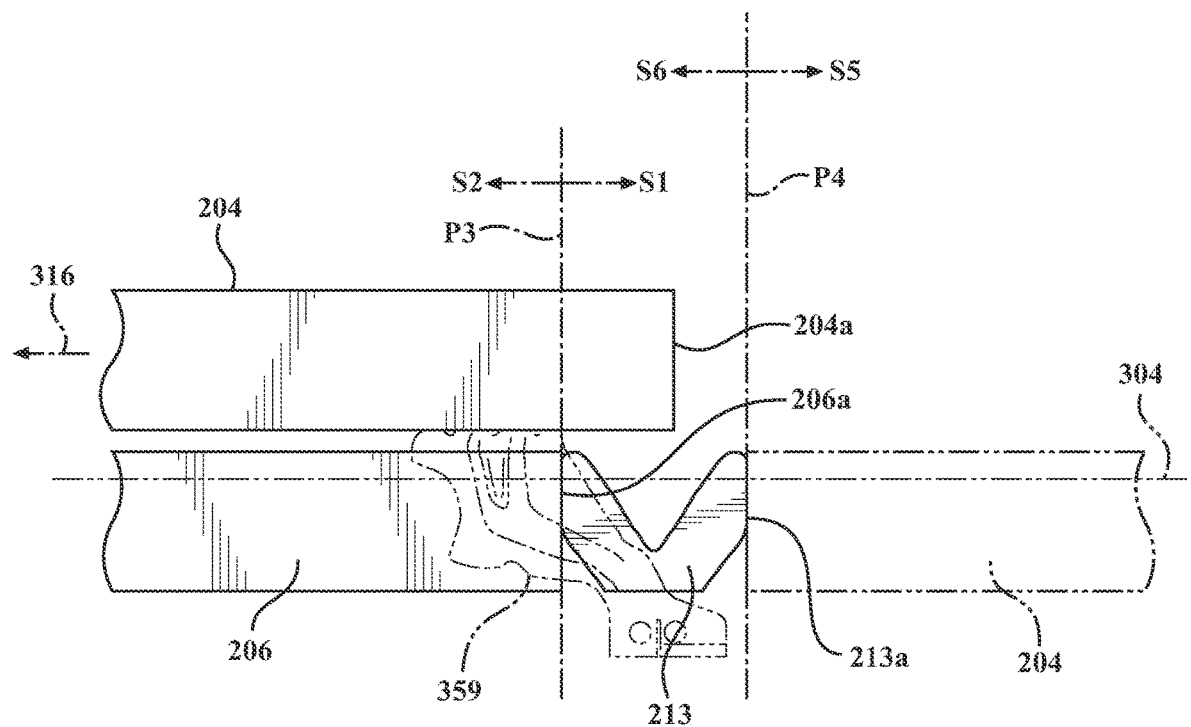
FIG. 14 is a schematic side view of a forward-most lateral edge of the second sunroof panel, illustrating a particular embodiment where a bracket supporting the first sunroof panel is positioned rearwardly of a plane extending through a forward-most lateral edge of a seal mounted along the second sunroof panel forward-most edge, when the first sunroof panel is in the fully open position.

Referring to FIG. 14, in some arrangements, the assembly 300 may also be structured so that, in arrangements including a seal 213 having a lateral edge 213a extending forwardly of the second sunroof panel lateral edge 206a as shown in FIGS. 2B and 10-12, the portion of the bracket 302 extending between the first sunroof panel 204 and the rail cavity opening 304d is movable from a first side S5 of a plane P4 extending through the seal edge 213a and perpendicular to the opening direction 316 of the first panel 204, to a second side S6 of the plane P4 opposite the first side of the plane, during movement of the first sunroof panel 204 from the closed position to the fully open position. FIG. 14 shows the portion of the bracket extending between the first sunroof panel 204 and the rail cavity opening 304d positioned along the second side S6 of the plane P4 when the first sunroof panel 204 is in the fully open position. In this arrangement, the size of the sunroof opening 214 when the first panel 204 is in the fully open position may be partially determined by the location of the lateral edge 213a, rather than by the location of the first sunroof panel first lateral edge 204a.

In particular arrangements incorporating the seal 213, the portion of the bracket extending between the first sunroof panel 204 and the rail cavity opening 304d may also reside on the second side S2 of the plane P3 extending along the lateral edge 206a of the second sunroof panel 206 when the first sunroof panel 204 is in the fully open position. In other arrangements incorporating the seal 213, and as shown in FIG. 14, the portion of the bracket extending between the first sunroof panel 204 and the rail cavity opening 304d may not reside on the second side S2 of the plane P3 extending along the lateral edge 206a of the second sunroof panel 206 when the first sunroof panel 204 is in the fully open position.

It will be appreciated that the systems, apparatus, and methods disclosed in the foregoing description provide numerous advantages. Examples disclosed herein provide drive mechanisms that can be used to advantageously control motion of a sunroof bracket and/or a panel held by the sunroof bracket during operation of a sunroof. Examples disclosed herein provide for more compact and/or lightweight sunroof architecture while improving performance associated with such sunroof mechanisms.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a sunroof of a vehicle, comprising:
   a longitudinal rail defining a longitudinal cavity having an opening;
   a first sunroof panel and a second sunroof panel, the first sunroof panel being movable with respect to the second sunroof panel between a closed position of the first sunroof panel and a fully open position of the first sunroof panel, the second sunroof panel having a lateral edge; and
   a bracket attached to the first sunroof panel so that the first sunroof panel moves with the bracket, the bracket including a pair of oppositely-extending, longitudinally-staggered pins, each pin being structured to slidably and/or rotatably engage one or more associated guide slots formed in the rail, to slidably and rotatably couple the bracket to the rail, a portion of the bracket extending from the first sunroof panel into the rail cavity opening and being operably connected to the rail so as to be movable along the rail cavity opening during movement of the first sunroof panel between the closed position and the fully open position,
   the assembly being structured so that the portion of the bracket is movable along the rail cavity opening from a first side of a plane extending through the second sunroof panel lateral edge and perpendicular to an opening direction of the first panel, to a second side of the plane opposite the first side of the plane, during movement of the first sunroof panel from the closed position to the fully open position.

2. The assembly of claim 1 wherein the rail includes a guide block positioned along a first side of the rail cavity and another guide block positioned along a second side of the rail cavity opposite the first side, wherein a first pin of the pair of pins rotatably and/or slidably engages one or more guide slots formed in the guide block, and wherein a second pin of the pair of pins rotatably and/or slidably engages one or more guide slots formed in the other guide block.

3. An assembly for a sunroof of a vehicle, comprising:
   a longitudinal rail defining a longitudinal cavity having an opening;
   a first sunroof panel and a second sunroof panel, the first sunroof panel being movable with respect to the second sunroof panel between a closed position of the first sunroof panel and
   a fully open position of the first sunroof panel, the second sunroof panel having a lateral edge; and
   a bracket attached to the first sunroof panel so that the first sunroof panel moves with the bracket, a portion of the bracket extending from the first sunroof panel into the rail cavity opening and being operably connected to the rail so as to be movable along the rail cavity opening during movement of the first sunroof panel between the closed position and the fully open position;
   a link extending into the rail cavity opening and structured to be movable along the rail cavity opening, the link being operably connected to the bracket so that the bracket is movable with the link along the rail cavity; and
   a drive shoe slidably mounted to the rail so as to be movable along the rail cavity, the drive shoe being operably connected to the link so that the link and the bracket are movable along and within the rail cavity by movement of the drive shoe,
   the assembly being structured so that the portion of the bracket is movable along the rail cavity opening from a first side of a plane extending through the second sunroof panel lateral edge and perpendicular to an opening direction of the first panel, to a second side of the plane opposite the first side of the plane, during movement of the first sunroof panel from the closed position to the fully open position.

4. The assembly of claim 3, wherein the second sunroof panel lateral edge is a forward-most lateral edge of the second sunroof panel and the assembly further comprises a seal operably attached to the second sunroof panel along the second sunroof panel lateral edge, the seal being structured to seal a seam formed between the first and second sunroof panels when the first sunroof panel is in the closed position, the seal having an edge spaced apart from the second sunroof panel lateral edge in a direction toward the first sunroof panel when the first sunroof panel is in the closed position, and wherein the assembly is structured so that a forward-most lateral edge of the first sunroof panel is movable from a first side of a plane extending through the seal edge and perpendicular to the opening direction of the first sunroof panel, to a second side of the plane opposite the first side of the plane.

5. The assembly of claim 3, wherein the first sunroof panel has a forward-most lateral edge, wherein the second sunroof panel lateral edge is a forward-most lateral edge of the second sunroof panel, and wherein the first sunroof panel forward-most lateral edge is movable to a position on the second side of the plane extending through the second sunroof panel lateral edge and perpendicular to the opening direction of the first panel.

6. The assembly of claim 3, wherein the second sunroof panel is structured so as not to overlie a portion of the rail cavity opening along which the portion of the bracket moves during motion of the first sunroof panel from a closed position to a fully open position.

7. The assembly of claim 3, wherein,
   the second sunroof panel lateral edge has a seal operably attached therealong, the seal being structured to seal a seam formed between the first and second sunroof panels when the first sunroof panel is in the closed position, the seal having an edge spaced apart from the second sunroof panel lateral edge in a direction toward the first sunroof panel when the first sunroof panel is in the closed position, the assembly being structured so that the portion of the bracket is movable from a first side of a plane extending through the seal edge and perpendicular to an opening direction of the first panel, to a second side of the plane opposite the first side of the plane, during movement of the first sunroof panel from the closed position to the fully open position.

8. The assembly of claim 3, wherein the bracket includes a pair of oppositely-extending, longitudinally-staggered pins, each pin being structured to slidably and/or rotatably engage one or more associated guide slots formed in the rail, to slidably and rotatably couple the bracket to the rail.

9. An assembly for a vehicle sunroof, comprising:
a rail defining a longitudinal cavity;
a first and a second sunroof panel, the first sunroof panel being movable between a closed position and a fully open position, the second sunroof panel having a lateral edge;
a bracket affixed to the first sunroof panel and operably connected to the rail so as to be movable along the rail cavity;
a link operably connected to the bracket and structured to be movable with the bracket along the rail cavity; and
a drive shoe slidably mounted to the rail so as to be movable along the rail cavity and operably connected to the link so that the link and the bracket are movable along the rail cavity by movement of the drive shoe, the assembly being structured so that the bracket is movable along the rail cavity from a first side of a plane extending through the second sunroof panel lateral edge and perpendicular to an opening direction of the first panel, to a second side of the plane opposite the first side of the plane, during movement of the first sunroof panel from the closed position to the fully open position.

10. The assembly of claim 9, wherein the first sunroof panel has a forward-most lateral edge, wherein the second sunroof panel lateral edge is a forward-most lateral edge of the second sunroof panel, and wherein the first sunroof panel forward-most lateral edge is movable to a position on the second side of the plane extending through the second sunroof panel lateral edge and perpendicular to the opening direction of the first panel.

* * * * *